(12) United States Patent
Okumura et al.

(10) Patent No.: US 7,114,002 B1
(45) Date of Patent: Sep. 26, 2006

(54) PACKET RETRANSMISSION SYSTEM, PACKET TRANSMISSION DEVICE, PACKET RECEPTION DEVICE, PACKET RETRANSMISSION METHOD, PACKET TRANSMISSION METHOD AND PACKET RECEPTION METHOD

(75) Inventors: Seiji Okumura, Tokyo (JP); Norihito Takatori, Tokyo (JP); Kazuma Fukuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 226 days.

(21) Appl. No.: 10/148,407

(22) PCT Filed: Oct. 5, 2000

(86) PCT No.: PCT/JP00/06941

§ 371 (c)(1),
(2), (4) Date: May 30, 2002

(87) PCT Pub. No.: WO02/30067

PCT Pub. Date: Apr. 11, 2002

(51) Int. Cl.
*G05F 15/16* (2006.01)

(52) U.S. Cl. ...................... 709/232; 709/233; 370/352; 370/401

(58) Field of Classification Search ................ 709/207, 709/232, 233; 714/748, 18; 370/429, 233, 370/252, 349, 397, 230, 352, 401
See application file for complete search history.

(56) References Cited

U.S. PATENT DOCUMENTS

| | | | |
|---|---|---|---|
| 5,754,754 A * | 5/1998 | Dudley et al. ................. | 714/18 |
| 6,483,845 B1 * | 11/2002 | Takeda et al. ............... | 370/429 |
| 6,674,718 B1 * | 1/2004 | Heddes et al. .............. | 370/230 |
| 6,684,354 B1 * | 1/2004 | Fukushima et al. .......... | 714/718 |

(Continued)

FOREIGN PATENT DOCUMENTS

JP 09214507 A 8/1997

(Continued)

OTHER PUBLICATIONS

Miyazaki, Akihiro et al., "RTP Payload Format to Enable Multiple Selective Retransmissions," draft-miyazaki-avt-rtp-selret-01.txt, Jul. 14, 2000.

*Primary Examiner*—Rupal Dharia
*Assistant Examiner*—Djenane Bayard
(74) *Attorney, Agent, or Firm*—Birch, Stewart, Kolasch & Birch, LLP

(57) ABSTRACT

In a packet retransmitting system for retransmitting a packet including a sequence number in a packet header, which is lost during packet communication, a transmitting equipment (110) includes a priority degree information attaching unit (113) for defining a plurality of priority degrees, setting an importance degree of each of the plurality of priority degrees for a packet, producing priority degree information by using the plurality of priority degrees, and attaching the priority degree information to the packet header included in the packet repeatedly for each of the plurality of packets, a transmitter (111) for transmitting the plurality of packets, and a retransmitting unit (119) for receiving a retransmission request packet and retransmitting a packet of which retransmission is requested in the retransmission request packet received. A receiving equipment (130) includes a receiving unit (131) for receiving the plurality of packets and a retransmission requesting unit (133) for extracting a plurality of sequence numbers and a plurality of priority degree information from the packet header, detecting lost packets based on the plurality of sequence numbers and the plurality of priority degree information extracted, detecting an important packet among the lost packets, and requesting retransmission of the packet.

27 Claims, 18 Drawing Sheets

U.S. PATENT DOCUMENTS

| | | | |
|---|---|---|---|
| 6,694,469 B1 * | 2/2004 | Jalali et al. | 714/748 |
| 6,697,331 B1 * | 2/2004 | Riihinen et al. | 370/236 |
| 6,744,738 B1 * | 6/2004 | Park et al. | 370/252 |
| 2001/0025301 A1 * | 9/2001 | Anderson | 709/207 |
| 2003/0179758 A1 * | 9/2003 | Furukawa et al. | 370/397 |

FOREIGN PATENT DOCUMENTS

| | | |
|---|---|---|
| JP | 10-065700 | 3/1998 |
| JP | 11284657 A | 10/1999 |
| JP | 2000-228676 | 8/2000 |

* cited by examiner

Fig. 2

| i = | 0 | 1 | 2 | ... | k | ... |
|---|---|---|---|---|---|---|
| SEQUENCE NUMBER | $SN_0$ | $SN_1$ | $SN_2$ | ... | $SN_k$ | ... |
| PRIORITY DEGREE DATA | $PLD_0$ | $PLD_1$ | $PLD_2$ | ... | $PLD_k$ | ... |
| SEQUENCE NUMBER IN PRIORITY DEGREE 0 | $PL_0(0)$ | $PL_1(0)$ | $PL_2(0)$ | ... | $PL_k(0)$ | ... |
| SEQUENCE NUMBER IN PRIORITY DEGREE 1 | $PL_0(1)$ | $PL_1(1)$ | $PL_2(1)$ | ... | $PL_k(1)$ | ... |
| SEQUENCE NUMBER IN PRIORITY DEGREE 2 | $PL_0(2)$ | $PL_1(2)$ | $PL_2(2)$ | ... | $PL_k(2)$ | ... |
| ... | ... | ... | ... | ... | ... | ... |
| SEQUENCE NUMBER IN PRIORITY DEGREE j | $PL_0(j)$ | $PL_1(j)$ | $PL_2(j)$ | ... | $PL_k(j)$ | ... |
| ... | ... | ... | ... | ... | ... | ... |
| SEQUENCE NUMBER IN PRIORITY DEGREE (PH − 1) | $PL_0(PH-1)$ | $PL_1(PH-1)$ | $PL_2(PH-1)$ | ... | $PL_k(PH-1)$ | ... |

INFORMATION ATTACHED TO PACKET HEADER { 401, 402

403, 404, 405, 406, 407

◄──── NUMBER OF PH ────►

◄──── PRIORITY DEGREE ────►
HIGH                    LOW

Fig. 6

| 0 | | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V | P | X | CC | | | | M | PT | | | | | | | SEQUENCE NUMBER | | | | | | | | | | | | | | | | |
| TIME STAMP | | | | | | | | | | | | | | | | | | | | | | | | | | | | | | | |
| SSRC | | | | | | | | | | | | | | | | | | | | | | | | | | | | | | | |
| CSRC ~801 | | | | | | | | | | | | | | | | | | | | | | | | | | | | | | | |
| S | PT | | | | | | Diff Time | | | | | | | | | PLD | | | | | | | | | | | | | | | |

Fig. 13

| 0 | 1 | 2 | 3 |
|---|---|---|---|
| 0 1 2 3 4 5 6 7 8 9 0 1 2 3 4 5 6 7 8 9 0 1 2 3 4 5 6 7 8 9 0 1 | | | |
| V | P | X | CC | M | PT | SEQUENCE NUMBER | ~1401 |
| TIME STAMP | | | |
| SSRC | | | |
| CSRC | | | |
| S | PT | Diff Time | PQ | PD |
| PLD | | | |

Fig. 14

| 0 | | | | | | | | 1 | | | | | | | | | 2 | | | | | | | | | 3 | | |
|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V | P | RC | | | | | PT | | | | | | | | | LENGTH | | | | | | | | | | | | | | | |
| SSRC | | | | | | | | | | | | | | | | | | | | | | | | | | | | | | | |
| CSRC | | | | | | | | | | | | | | | | | | | | | | | | | | | | | | | |
| FIRST PL (0) | | | | | | | | LAST PL (0) | | | | | | | | FIRST PL (1) | | | | | | | | LAST PL (1) | | | | | | | |

|0| |1| |2| |3| |
|---|---|---|---|---|
|0 1 2 3 4 5 6 7|8 9 0 1 2 3 4 5|6 7 8 9 0 1 2 3|4 5 6 7 8 9 0 1| |
| V P X CC | M PT | SEQUENCE NUMBER | | ~201 |
| TIME STAMP | | | | |
| SSRC | | | | |
| CSRC | | | | |
| S PT | SSN | D | Diff Time | |

PACKET RETRANSMISSION SYSTEM, PACKET TRANSMISSION DEVICE, PACKET RECEPTION DEVICE, PACKET RETRANSMISSION METHOD, PACKET TRANSMISSION METHOD AND PACKET RECEPTION METHOD

This application is the national phase under 35 U.S.C. § 371 of PCT International Application No. PCT/JP00/06941 which has an International filing date of Oct. 5, 2000, which designated the United States of America.

TECHNICAL FIELD

This invention relates to a system and a method of requesting retransmission between a server for distributing data, e.g., multimedia data which have a plurality of priority degrees and a client based on the plurality of priority degrees when a packet is lost.

BACKGROUND ART

Generally, a packet transmitted in a network is often lost due to an overflow at a node (router) provided in the network, bit error in a wireless space, etc. In such a case, there is a method in which a receiver requests a transmitter to retransmit a lost packet, and the transmitter who is requested to retransmit retransmits the lost packet.

For example, in a protocol of TCP (Transmission Control Protocol), the receiver transmits an ACK packet to the transmitter for acknowledging receipt. When the ACK packet is not returned to the transmitter, the transmitter judges that the receiver has not received a packet and retransmits the packet. As stated, the TCP protocol is a reliable transfer protocol.

However, unlike downloading of data, it is not necessary to receive all of data for reproducing the data in streaming distribution in multimedia. Therefore, the receiver can request to retransmit only an important data packet when the packet is lost, and the transmitter can retransmit only the important data packet. Since only the important packet is retransmitted, a band (bandwidth) can be utilized effectively. Further, since the receiver does not wait for the retransmission of an unnecessary data packet, real-time characteristics can be improved.

A retransmission control system for the above-stated purposes is disclosed in Japanese Unexamined Published Patent Application Hei 9-214507 and Japanese Unexamined Published Patent Application Hei 11-284657.

The retransmitting system disclosed in Japanese Unexamined Published Patent Application Hei 9-214507 uses a wireless communication method for performing real-time communication while guaranteeing a possible best quality. In the wireless communication method, when the packet is lost, the retransmission is tried a few times. If the retransmission does not reach the receiver after trying, a packet in a low priority degree is cancelled, and the retransmission is tried.

A retransmitting system disclosed in Japanese Unexamined Published Patent Application Hei 11-284657 is a retransmission control system in a connection establishing type communication for suppressing communication of a packet in a low priority degree at a time of congestion. In this retransmission control system, a possible number of retransmission to each connection is set, and the possible number of retransmission is reduced by one after retransmission. When the possible number of retransmission becomes zero, communication to the connection is stopped, and a band in a high priority degree is secured as much as possible.

Further, as a protocol for data transfer with high real-time characteristics, e.g., streaming distribution, RTP (Real-Time Transport Protocol) is a standard related to Internet, e.g., RFC (Request for Comments) 1889. The RTP is a protocol for transmitting a packet to which a sequence number and a timestamp are attached. Some retransmitting systems using the RTP are proposed.

As a method for extending a retransmission function of the RTP, an Internet draft (draft-miyazaki-avt-rtp-selret-01.txt) titled "RTP Payload Type Format to Enable Multiple Selective Retransmissions" has been submitted to IETF (Internet Engineering Task Force). In this method for extending the retransmission function written in the Internet draft, there is a second sequence number (SSN: Second Sequence Number) allocated only to an important packet to be retransmitted besides a RTP sequence number. By using the SSN, the receiver can identify the important packet to be retransmitted, and even if the packet is lost, the receiver can request to retransmit only the important packet. In this Internet draft, a RTP header in a RTP packet transferred from the transmitter to the receiver is configured as illustrated in FIG. 16 (201). FIG. 17 (202) illustrates a RTCP (Real-Time Contral Protocol) packet for requesting the retransmission, which is transferred from the receiver to the transmitter. In the RTP header illustrated in FIG. 16 (201), the RTP header of the RFC 1889 is extended by 4 bytes, and a SSN field is provided there. The SSN is different from the RTP sequence number. In the SSN, an initial value is zero, and the value is increased by one only for the important packet which should be retransmitted. Further, S is SSNIndicator for indicating that the SSN is increased by one.

FIG. 18 shows a process of specifying a packet of which retransmission is requested based on the SSN included in the RTP header of FIG. 16 (201) by the receiver. As illustrated in FIG. 18, the RTP sequence number is increased by one for every packet (301), but the SSN is increased by one only for each of important packets (302). Further, it is possible to detect a timing when the SSN is increased by one. As stated, the SSN indicates that the packet in which the SSN is increased by one is the important packet which should be retransmitted when the packet is lost.

For example, when the receiver receives a packet of RTP sequence number 15 just after a packet of RTP sequence number 10, packets of RTP sequence numbers 11–14 are lost. In this case, the SSN of the packet of RTP sequence number 10 is 3, and the SSN of the packet of RTP sequence number 15 is 6. Since the SSN is increased from 3 to 6 inconsecutively, it is easy to judge that two important packets of which SSN's are 4 and 5, which should be retransmitted, are lost. Further, since it is judged that the packet of RTP sequence number 15 is not an important packet to be retransmitted based on a S bit in the RTP header (303), an important packet of which SSN is 6 is also lost. Therefore, the receiver transmits values of the SSN's, i.e., 4, 5, and 6, of the packets which should be retransmitted as a retransmission request to the transmitter. The transmitter retransmits an important packet to be transmitted, of which S bit of the RTP header is 1, among the packets of which SSN's are 4, 5 and 6.

As stated, in the retransmission according to the TCP protocol, since a retransmission packet is waited for, it takes time for the retransmission. Further, an excess of the ACK packet and an increase of the retransmission packet pressure a band, and cause congestion. Further, the receiver waits for the retransmission packet and requests the retransmission many times. The receiver is performing a useless retransmission processing.

The retransmitting system of the RTP written in the Internet draft titled "RTP Payload Type Format to Enable Multiple Selective Retrasmissions" is a retransmitting system when one priority degree is set. For setting a plurality of priority degrees, a plurality of SSN's is necessary. Consequently, a length of the RTP header becomes longer. In an example of FIG. 18, a combination of the SSN and the S is increased for one RTP sequence number.

DISCLOSURE OF THE INVENTION

A packet retransmitting system according to this invention for transmitting a packet including a sequence number for defining a sequence of data included in each of a plurality of packets through a network and retransmitting a packet which is lost during transmission includes a transmitting equipment for transmitting the plurality of packets and a receiving equipment for receiving the plurality of packets sent by the transmitting equipment. The transmitting equipment includes a priority degree information attaching unit for defining a plurality of priority degrees indicating an importance degree of the data, producing priority degree information by using the plurality of priority degrees defined, and attaching the priority degree information produced to the packet, a transmitting unit for transmitting a plurality of packets to which the priority degree information is attached by the priority degree information attaching unit through the network, and a retransmitting unit for receiving a retransmission request for requesting to retransmit a packet from the receiving equipment after the transmitting unit transmits the plurality of packets and retransmitting the packet of which retransmission is requested in the retransmission request received. The receiving equipment includes a receiving unit for receiving the plurality of packets sent by the transmitting equipment through the network and a retransmission requesting unit for inputting the plurality of packets received by the receiving unit, extracting a plurality of sequence numbers and a plurality of priority degree information from each of the plurality of packets input, judging lost packets based on the plurality of sequence numbers extracted, detecting an important packet among the lost packets judged based on the plurality of priority degree information extracted, and transmitting the retransmission request to the transmitting equipment to request to retransmit the packet detected.

A transmitting equipment according to this invention for transmitting a packet including a sequence number for defining a sequence of data included in each of a plurality of packets through a network includes a priority degree information attaching unit for defining a plurality of priority degrees indicating an importance degree of the data, producing priority degree information by using the plurality of priority degrees defined, and attaching the priority degree information produced to the packet and a transmitting unit for transmitting the packet to which the priority degree information is attached by the priority degree information attaching unit through the network.

The priority degree information attaching unit includes a priority degree setting unit for setting an importance degree for each of the plurality of priority degrees, a priority degree memory for storing the plurality of priority degrees set by the priority degree setting unit, and a priority degree information calculating unit for producing the priority degree information by using the plurality of priority degrees stored in the priority degree memory and the sequence number included in the packet.

The priority degree setting unit defines the plurality of priority degrees hierarchically by setting an order, and the priority degree information calculating unit calculates the priority degree information by giving priority to a priority degree in a high order.

The priority degree setting unit selects a priority degree one by one from a higher order among the plurality of priority degrees, judges an importance degree of data included in the packet based on the priority degree selected, and increases a value of the priority degree selected by one and sets the value of the priority degree selected when it is judged as an important packet.

The priority degree information calculating unit produces the priority degree information by using a result of adding one of values of the plurality of priority degrees corresponding to the packet to a product of a determined value and the sequence number included in the packet.

When a number of the plurality of priority degrees is defined as PH, a value of the plurality of priority degrees is defined as PL(PH), a counter is defined as N, a sequence number included in the arbitrary packet is defined as SN, and a value of the priority degree information calculated for each of the plurality of priority degrees is defined as PLD(PH) for an arbitrary packet, the priority degree information calculating unit substitutes PL(0) for PLD(0) and calculates PLD(N)=the determined value×SN+PL(N) for each of N in a value of 0<N<PH, defines PLD(PH−1) in case of N=PH−1 as the priority degree information PLD of the arbitrary packet, obtains the priority degree information by calculating PLD (PH−1) for each of the plurality of packets, and calculates the plurality of priority degree information.

The priority degree information calculating unit uses a value of PLD(N−1) as the determined value.

The priority degree information calculating unit uses one of (|PLD(N−1)−PL(N)|) which is an absolute value of a difference between PLD(N−1) and PL(N), (|SN−PLD(N−1)|) which is an absolute value of a difference between SN and PLD(N−1), and (|SN−PL(N)|) which is an absolute value of a difference between SN and PL(N) as the determined value.

The priority degree information calculating unit defines a minimum value among |PLD(N−1)−PL(N)|, |SN−PLD(N−1) |, |SN−PL(N)| as Q, defines an identifier for identifying which value among three values is defined as Q as PQ, defines an identifier for identifying which is larger between X and Y as PD when Q=|X−Y|, sets PQ=TYPE1, PD=0, R=PL(N) in case of Q=|PLD(N−1)−PL (N)| and PLD(N−1) ≧PL(N), sets PQ=TYPE1, PD=1, R=PLD(N−1) in case of Q=|PLD(N−1)−PL(N)| and PLD(N−1)<PL(N), sets PQ=TYPE2, PD=0, R=PL(N) in case of Q=|SN−PLD(N−1)| and SN≧PLD(N−1), sets PQ=TYPE2, PD=1 in case of Q=|SN−PLD(N−1)| and SN<PLD(N−1), and sets PQ=TYPE3, PD=0, R=PLD(N−1) in case of Q=|SN−PL(N)|, and calculates PLD(PH−1). The priority degree information attaching unit attaches PLD(PH−1), PQ and PD to the packet as the priority degree information.

The transmitting equipment further includes a retransmitting unit for receiving a retransmission request packet for requesting retransmission of a packet after transmitting the plurality of packets from the transmitting unit, retrieving a packet of which retransmission is requested in the retransmission request packet received, and retransmitting the packet retrieved.

A receiving equipment according to this invention includes a receiving unit for receiving a plurality of packets including a sequence number which defines a sequence of data included in each of the plurality of packets and priority degree information produced based on a plurality of priority degrees indicating an importance degree of data included through a network and a retransmission requesting unit for inputting the plurality of packets received by the receiving unit, extracting a plurality of sequence numbers and a plurality of priority degree information from each of the plurality of packets input, judging lost packets based on the plurality of sequence numbers extracted, detecting an important packet among the lost packets judged based on the plurality of priority degree information, and transmitting a retransmission request to request to retransmit the packet detected.

The retransmission requesting unit detects the important packet by using the importance degree indicated in each of the plurality of priority degrees included in the plurality of priority degree information.

The retransmission requesting unit includes a packet information memory for storing the plurality of sequence numbers and the plurality of priority degree information extracted, a priority degree calculating unit for calculating a value of a plurality of priority degrees by using the sequence numbers and the priority degree information stored in the packet information memory, and a lost packet detecting unit for judging a lost packet based on the plurality of sequence numbers and detecting if any important packet is lost based on the value of the plurality of priority degrees calculated by the priority degree calculating unit.

The priority degree calculating unit calculates a quotient and a remainder by dividing the priority degree information by the sequence number, and calculates a value of the plurality of priority degrees by using the quotient and the remainder calculated.

When the priority degree information is defined as PLD, the sequence number included in an arbitrary packet is defined as SN, a number of the plurality of priority degrees is defined as PH, a value of the plurality of priority degrees is defined as PL(PH), and a counter is defined as N for an arbitrary packet, the priority degree information calculating unit substitutes an initial value of N in a range of $0 \leq N < PH$ for N=PH−1, substitutes a remainder of PLD/SN for PL(N), substitutes a quotient of PLD/SN for PLD, repeats a calculation of deducting N by 1 till N reaches 0, calculates a value of the plurality of priority degrees by substituting a value of PLD for PL(0) in case of N=0, calculates PL(PH) for each of the plurality of packets, and calculates the value of the plurality of priority degrees corresponding to the plurality of packets. The lost packet detecting unit judges if a packet with a priority degree indicated by PL(N) is lost based on a difference between values of a maximum value in PL(N) corresponding to each of the plurality of packets received and PL(N) of the arbitrary packet, and when the packet has been lost, detects the PL(N) of the packet.

The priority degree information includes priority degree data produced from the plurality of priority degrees, an identifier for indicating a type of data used for producing the priority degree data, and a flag for indicating a size of a value of the identifier for each of arbitrary packets. When the priority degree data are defined as PLD, the identifier is defined as PQ, the flag is defined as PD, a number of the plurality of priority degrees is defined as PH, a value of the plurality of priority degrees is defined as PL(PH), and a counter is defined as N for an arbitrary packet, the priority degree information calculating unit substitutes an initial value of N in a range of $0 \leq N < PH$ for N=PH−1, defines TYPE1, TYPE2 and TYPE3 as types of the identifier PQ, defines that a value of the flag PD is one of 0 and 1, defines a quotient Q obtained by dividing PLD by SN as Q and a remainder as R, sets PL(N)=R and substitutes Q+R for PLD in case of PQ=TYPE1 and PD=0, sets PL(N)=Q+R and substitutes R for PLD in case of PQ=TYPE1 and PD=1, sets PL(N)=R and substitutes SN−Q for PLD in case of PQ=TYPE2 and PD=0, sets PL(N)=R and substitutes Q+SN for PLD in case of PQ=TYPE2 and PD=1, sets PL(N)=SN−Q and substitutes R for PLD in case of PQ=TYPE3, repeats a calculation of deducting N by 1 from N=PH−1 to N=1, calculates PL from PL(0) to PL(PH−1) by substituting PLD for PL(0) in case of N=1. The lost packet detecting unit judges if an important packet in the priority degree N is lost based on a difference between values of a maximum value of PL(N) of a packet and PL(N) of an arbitrary packet among the plurality of packets received by the receiving unit and detects the PL(N) of the packet lost when the packet has been lost.

The retransmission requesting unit further includes a retransmission request selecting unit for selecting a particular priority degree among the plurality of priority degrees. The lost packet detecting unit detects loss of a packet based on the particular priority degree selected by the retransmission request selecting unit.

A packet retransmitting method according to this invention for transmitting a packet including a sequence number for defining a sequence of data included in each of a plurality of packets from a transmitter to a receiver through a network and retransmitting a packet which is lost during transmission includes, in the transmitter, defining a plurality of priority degrees indicating an importance degree of data, producing priority degree information by using the plurality of priority degrees defined, attaching the priority degree information produced to the packet, repeating producing the priority degree information and attaching the priority degree information to each of the plurality of packets, and transmitting the plurality of packets to which the priority degree information is attached to the receiver through the network, and in the receiver, receiving the plurality of packets through the network, extracting a plurality of sequence numbers and a plurality of priority degree information from each of the plurality of packets received, judging lost packets based on the plurality of sequence extracted, detecting an important packet among the lost packets judged based on the plurality of priority degree information extracted, and transmitting a retransmission request to the transmitter to request to retransmit the packet detected.

A packet transmitting method according to this invention for transmitting a packet including a sequence number for defining a sequence of data included in each of a plurality of packets through a network includes defining a plurality of priority degrees indicating an importance degree of the data, producing priority degree information by using the plurality of priority degrees defined, attaching the priority degree information produced to the packet, and transmitting the packet to which the priority degree information is attached through the network.

The step of defining the priority degrees includes defining the plurality of priority degrees hierarchically by setting an order, selecting a priority degree from a higher priority degree among the plurality of priority degrees, judging an importance degree in the selected priority degree, and adding one to a value of the selected priority degree when it is judged as an important packet. The step of producing the priority degrees information includes producing the priority degree information by using a result of adding a value of one of the plurality of priority degrees corresponding to the packet to a product of a determined value and a sequence number included in the packet.

The step of defining the priority degrees includes setting values of the plurality of priority degrees corresponding to the plurality of packets by setting a value of the plurality of priority degrees repeatedly for the plurality of packets. The step of producing the priority degree information includes producing the priority degree information corresponding to each of the plurality of packets by producing the priority degree information repeatedly for the plurality of packets.

A packet receiving method according to this invention includes receiving a plurality of packets including a sequence number for defining a sequence of data included in each of the plurality of packets and priority degree information produced based on a plurality of priority degrees indicating an importance degree of data stored in each of the plurality of packets through a network, extracting a plurality of sequence numbers and a plurality of priority degree information from the plurality of packets received, judging lost packets based on the plurality of sequence numbers extracted, detecting an important packet based on the plurality of priority degree information extracted among the packets judged as the lost packets, and transmitting a retransmission request for requesting to retransmit the packet detected.

BRIEF DESCRIPTION OF THE DRAWINGS

FIG. 2 illustrates an example of priority degree information and a plurality of priority degrees;

FIG. 6 illustrates an example of a configuration of a RTP packet header in Embodiment 1;

FIG. 13 illustrates an example of a configuration of the RTP packet header in Embodiment 2;

FIG. 14 illustrates an example of a configuration of the RTCP for requesting the retransmission in Embodiment 2;

FIG. 16 illustrates an example of the RTP packet header according to the related art;

BEST MODE FOR CARRYING OUT THE INVENTION

Figure 1:
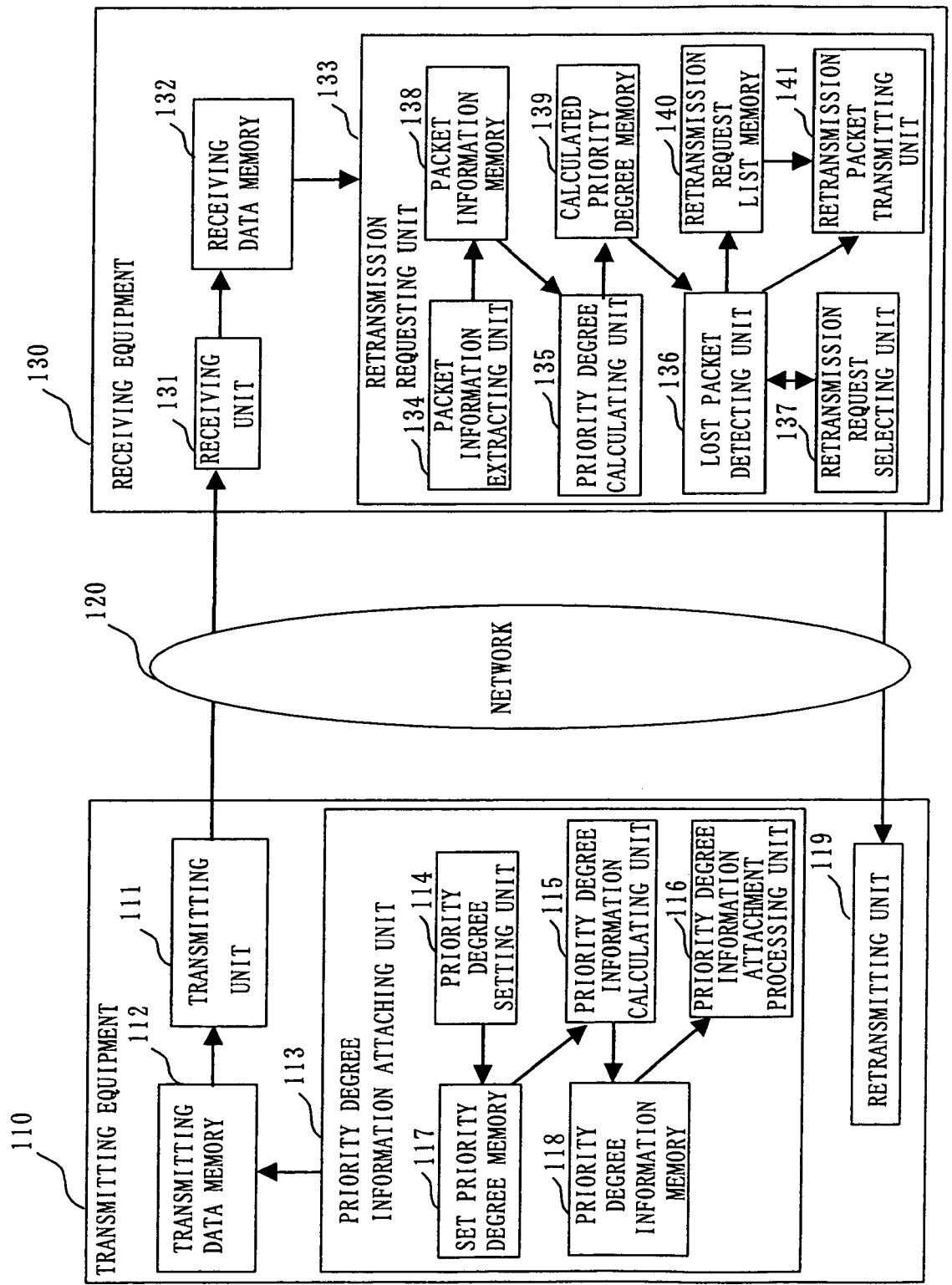
FIG. 1 illustrates an example of a configuration of a packet retransmitting system according to this invention.

FIG. 1 illustrates an example of a configuration of a packet retransmitting system according to this invention.

In the specifications, a packet is a packet including a sequence number. In explanation of the following embodiments, the RTP packet is used as an example of the packet including the sequence number. However, the packet is not limited to the RTP packet. The packet retransmitting system according to this invention can be applied to any packet including the sequence number. Further, it is also possible that a packet includes a packet header and the packet header includes a sequence number which defines an arrangement sequence of data included in the packet.

In the following explanation, an example of including the packet header is explained.

In the following explanation, a priority degree is a value indicating an importance degree of data included in an arbitrary packet. In this packet retransmitting system, a plurality of priority degrees is set for the arbitrary packet. The plurality of priority degrees is hierarchical, and a priority order is set among the plurality of priority degrees. Priority degree information is information indicating a priority degree of a packet generated based on the plurality of priority degrees. The priority degree information is produced based on the plurality of priority degrees by the transmitter. The receiver receives the priority degree information, and calculates the plurality of priority degrees of the packet based on the received priority degree information.

In the following, the configuration of the packet retransmitting system illustrated in FIG. 1 as an example is explained.

The packet retransmitting system in FIG. 1 includes a transmitting equipment 110, a network 120 and a receiving equipment 130.

The network 120 can be either wireless or wired, and it can be any communication network as far as the packet can be transmitted in the network.

The transmitting equipment 110 includes a transmitting unit 111, a transmitting data memory 112, a priority degree information attaching unit 113 and a retransmitting unit 119.

The transmitting unit 111 transmits a packet at a specified time.

The transmitting data memory 112 stores a plurality of packets sent by the transmitting unit 111.

The priority degree information attaching unit 113 defines a plurality of priority degrees. The priority degree information attaching unit 113 sets an importance degree of each of the plurality of priority degrees defined, produces priority degree information by using the plurality of priority degrees, and attaches the produced priority degree information to the packet header included in the packet. The priority degree information attaching unit 113 sets the importance degree, produces the priority degree information, and attaches the priority degree information to the packet header for each of a plurality of packets which are sent.

After the transmitting equipment 110 transmits the plurality of packets, the retransmitting unit 119 receives a retransmission request packet for requesting retransmission of a packet, retrieves a packet of which retransmission is requested in the received retransmission request packet, and retransmits the retrieved packet.

The priority degree information attaching unit 113 includes a priority degree setting unit 114, a priority degree information calculating unit 115, a priority degree information attachment processing unit 116, a set priority degree memory 117, and a priority degree information memory 118.

The priority degree setting unit 114 sets the importance degree (value of the priority degree) for each of the plurality of priority degrees.

The set priority degree memory 117 stores the plurality of priority degrees set by the priority degree setting unit 114.

The priority degree information calculating unit 115 produces the priority degree information by using the plurality of priority degrees stored in the set priority degree memory 117 and the sequence number included in the packet header.

The priority degree information memory 118 stores the priority degree information produced by the priority degree information calculating unit 115.

The priority degree information attachment processing unit 116 attaches the priority degree information produced by the priority degree information calculating unit 115 and stored in the priority degree information memory 118 to the packet header included in the packet.

It is also possible that the set priority degree memory 117 uses a storage area in the priority degree setting unit 114 and outputs the plurality of priority degrees set by the priority degree setting unit 114 to the priority degree information calculating unit 115 directly. Further, it is also possible that the priority degree information memory 118 uses a storage area in the priority degree information calculating unit 115, uses the storage area in the priority degree information calculating unit 115 and outputs the priority degree information produced by the priority degree information calculating unit 115 to the priority degree information attachment processing unit 116 directly. Further, the set priority degree memory 117 and the priority degree information memory 118 can be realized as one memory.

Next, the receiving equipment 130 is explained.

The receiving equipment 130 includes a receiving unit 131, a receiving data memory 132 and a retransmission requesting unit 133.

The receiving unit 131 receives the plurality of packets sent from the transmitting equipment 110 through the network 120.

The receiving data memory 132 stores the packets received by the receiving unit 131.

The retransmission requesting unit 133 inputs the plurality of packets received by the receiver 131, extracts a plurality of sequence numbers and a plurality of priority degree information from packet headers included in the plurality of input packets respectively, judges lost packets based on the plurality of extracted sequence numbers, detects an important packet among the lost packets based on the plurality of priority degree information, and requests retransmission of the detected packet.

The retransmission requesting unit 133 includes a packet information extracting unit 134, a priority degree calculating unit 135, a lost packet detecting unit 136, a retransmission request selecting unit 137, a packet information memory 138, a calculated priority degree memory 139, a retransmission request list memory 140 and a retransmission packet transmitting unit 141.

The packet information extracting unit 134 reads the plurality of packets received by the receiving unit 131 and stored in the receiving data memory 132, and extracts the plurality of sequence numbers and the plurality of priority degree information from the packet headers included in the plurality of read packets respectively.

The packet information memory 138 stores the plurality of sequence numbers and the plurality of priority degree information extracted by the packet information extracting unit 134.

The priority degree calculating unit 135 calculates a plurality of priority degrees from the sequence numbers and the priority degree information stored in the packet information memory 138.

The calculated priority degree memory 139 stores the plurality of priority degrees calculated by the priority degree calculating unit 135.

The lost packet detecting unit 136 reads the plurality of priority degree information calculated by the priority degree calculating unit 135 and stored in the calculated priority degree memory 139, detects the lost packets based on the plurality of sequence numbers, judges if any important packet is lost for each of the plurality of priority degrees based on the plurality of priority degrees calculated by the priority degree calculating unit, and detects loss of the important packet. The lost packet detecting unit 136 treats the detected packet as the retransmission request packet for requesting the retransmission and creates a retransmission request list.

The retransmission request selecting unit 137 selects a particular priority degree among the plurality of priority degrees, and notifies the lost packet detecting unit 136 of the selected priority degree.

The retransmission request list memory 140 stores the retransmission request list created by the lost packet detecting unit 136.

The retransmission packet transmitting unit 141 transmits the retransmission request packet to the transmitting equipment 110 based on the retransmission request list stored in the retransmission request list memory 140.

Further, it is also possible that the calculated priority degree memory 139 uses a storage area in the priority degree calculating unit 135 and outputs the plurality of priority degrees calculated by the priority degree calculating unit 135 to the lost packet detecting unit 136 directly. It is also possible that the packet information memory 138, the calculated priority degree memory 139 and the retransmission request list memory 140 are configured either as one memory or a plurality of memories.

With reference to FIG. 2, an example of a configuration of the RTP sequence numbers and the priority degrees in the packet retransmitting system including the plurality of priority degrees is explained.

In FIG. 2, 402 is stored in the priority degree information memory 118, and 403≠407 are stored in the set priority degree memory 117.

A number of the priority degrees is set as priority degree hierarchy (PH). A priority degree in an arbitrary priority degree hierarchy (PH) is set as a priority degree N, and a sequence number (value indicating an importance degree) of the priority degree N is set as PL(N). A range of N is $0 \leq N \leq PH-1$. When N is smaller, the priority degree is higher. Stated setting is performed by the priority degree setting unit 114.

For example, an important packet to be retransmitted identified by PL(0) has a higher priority degree than an important packet to be retransmitted identified by other PL(1)≠PL(PH−1).

Further, the RTP sequence number (first sequence number) of each of the packets is set as SN, and priority degree data included in the priority degree information is set as PLD. The plurality of packets are indicated as packet i (i=0, 1, 2, . . . k, . . . ). PLD, PL(N) and SN of the i-th packet are set as PLDi, PLi(N) and SNi respectively.

The PL(N) is same as a case when there is a plurality of second sequence numbers SSN's defined in the Internet draft titled "RTP Payload Type Format to Enable Multiple Selective Retransmissions" according to the related art. The PL(N) is a sequence number increased by one for each of important packets to be retransmitted in the priority degree N, and it is a value indicating an importance degree of the priority degree N. The important packet to be retransmitted is the packet which should be transferred again when the packet transferred from the transmitter to the receiver is lost. Therefore, if the PL(N) of the RTP packet received now by the receiver is larger than the PL(N) of a packet received previously by one, the packet received now can be identified as the important packet to be retransmitted in the priority degree N.

Further, in the packet retransmitting system according to this invention, even when the plurality of priority degrees (PH>1) is provided for the RTP, the transmitter can attach one of PLD to the packet header instead of attaching N number of PL's to the packet header as in the system according to the related art. The receiver can recognizes values of the plurality of priority degrees (importance degrees) (PL) by the one of PLD attached, and request retransmission only for a priority degree N (hierarchy of priority degrees) which is appropriate for a network condition. For example, when a network condition is bad, a band necessary for the retransmission should be reduced. Therefore, the retransmission is requested only for (P_Level−1) number of the priority degrees, i.e., N=0, 1, 2, . . . , P_Level (P_Level<PH−1), which are higher priority degrees, instead of all the priority degrees (0≦N≦PH−1). Further, when all the priority degrees are used, P_Level is PH−1.

Further, it is assumed that the important packets to be retransmitted do not exist simultaneously in the plurality of priority degrees. When the packet of PLi(N) is the important packet to be retransmitted (i.e., PLi(N) is increased by one from the PLi−1(N)), there is no important packet to be retransmitted in the priority degrees higher than N.

Figure 3:
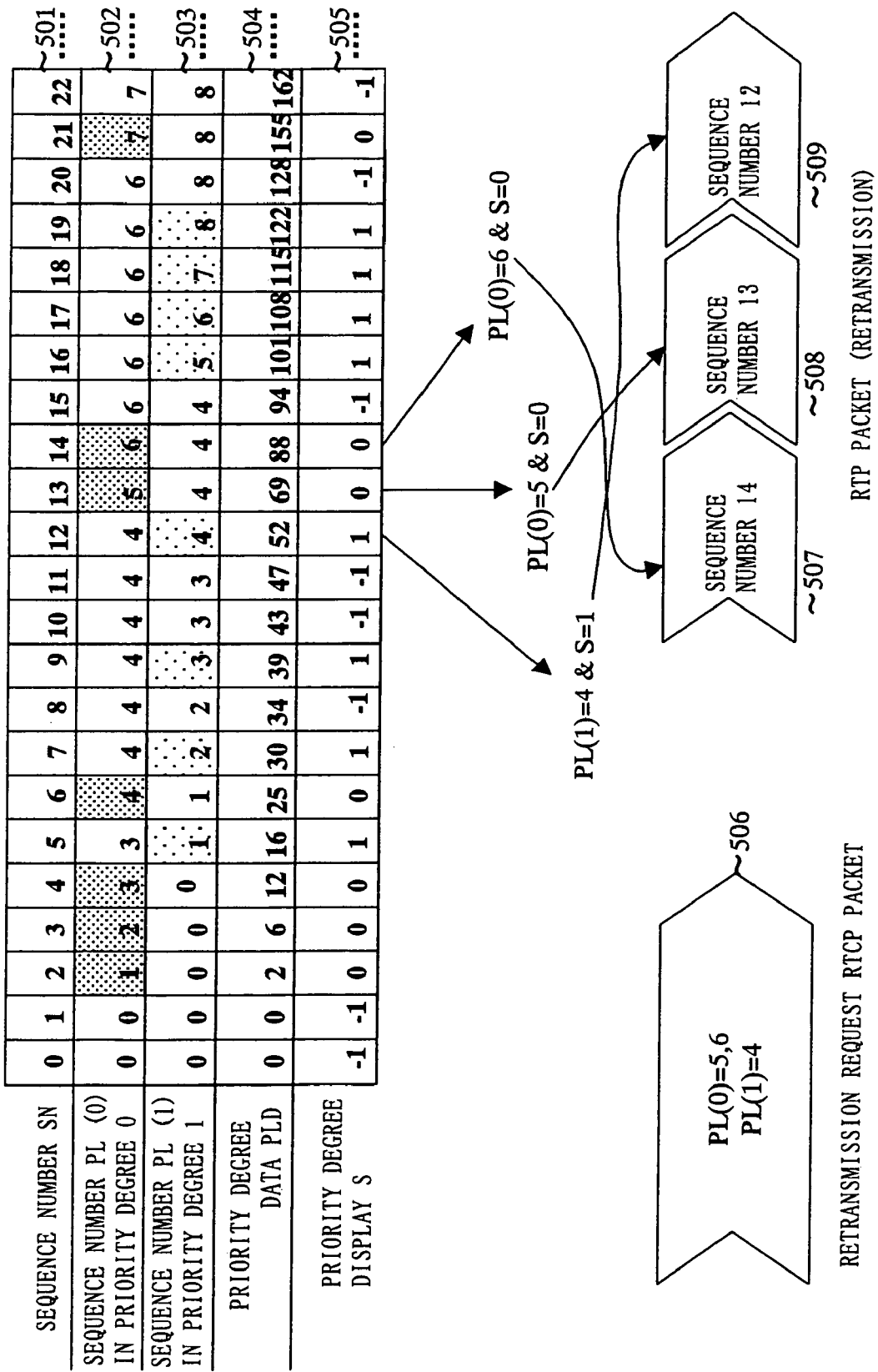
FIG. 3 illustrates an example of a retransmission request and a method for detecting a retransmission packet.

In an upper part of FIG. 3, an example of the plurality of priority degrees stored in the set priority degree memory 117 and a process for detecting the retransmission packet is illustrated. For example, in FIG. 3, in a priority degree 0, PL(0) is increase by one from 3 to 4 for a packet of sequence number 6. This shows that the packet of sequence number 6 is the important packet to be retransmitted in the priority degree 0. In this case, in a priority degree 1, PL(1) is not increased. Therefore, it is not the important packet to be retransmitted in the priority degree 1. Further, when a packet is an important packet to be retransmitted in a priority degree N, the priority degree N is set as a priority degree display S(S=N), S for the packet i (i=0, 1, 2, . . . , k . . . ) is set as Si. An initial value of Si is −1. This shows that the packet i with Si=−1 is not the important packet to be retransmitted in all the priority degrees.

The packet retransmitting system according to this invention can be also adapted to a transmission protocol including the sequence number besides the RTP packet.

In the following, the priority degree is explained.

The priority degree setting unit 114 defines the plurality of priority degrees hierarchically by setting an order.

Further, the priority degree setting unit 114 selects a priority degree from a higher order sequentially among the plurality of priority degrees for a packet, and judges an importance degree of the packet concerning on the selected priority degree. If it is judged that the packet is an important packet, one is added to a value of the selected priority degree. This is repeated for each of the plurality of priority degrees, and values of the plurality of priority degrees are set. The priority degree setting unit 114 repeatedly sets the values of the plurality of priority degrees as stated for each of the plurality of packets which are sent, and sets the values of the plurality of priority degrees corresponding to each of the plurality of packets.

Next, the priority degree information is explained.

A procedure of calculating PLD for an arbitrary packet by the priority degree information calculating unit 115 is explained when a number of the plurality of priority degrees is defined as PH, a value of the plurality of priority degrees is defined as PL(PH), a counter is defined as N, a sequence number included in a packet header of the arbitrary packet is defined as SN, and the priority degree data calculated for each of the plurality of priority degrees are defined as PLD(PH).

The priority degree information calculating unit 115 substitutes PL(0) for PLD(0), and calculates PLD(N)=determined value×SN+PL(N) for each of N in a value of 0<N<PH. PLD(PH−1) in case of N=PH−1 is set as the priority degree data PLD of the arbitrary packet.

In Embodiment 1, a case of using a value of PLD(N−1) as the determined value is explained.

In Embodiment 2, as the determined value, a minimum value among (|PLD(N−1)−PL(N)|) which is an absolute value of a difference between PLD(N−1) and PL(N), (|SN−PLD(N−1)|) which is an absolute value of a difference between SN and PLD(N−1), and (|SN−PL(N)|) which is an absolute value of a difference between SN and PL(N) is used.

In the following, a case in which the priority degree data PLD are included in the priority degree information is explained. In Embodiment 2, a case in which other data, e.g., identifier, etc. are included in the priority degree information in addition to the priority degree data PLD is explained. Further, in the following explanation, the priority degree data can be also called as the priority degree information unless clearly stated.

In the following, actual operations by the transmitter and the receiver are explained.

EMBODIMENT 1

In this embodiment, an example in case of PH=2 is explained.

Figure 4:
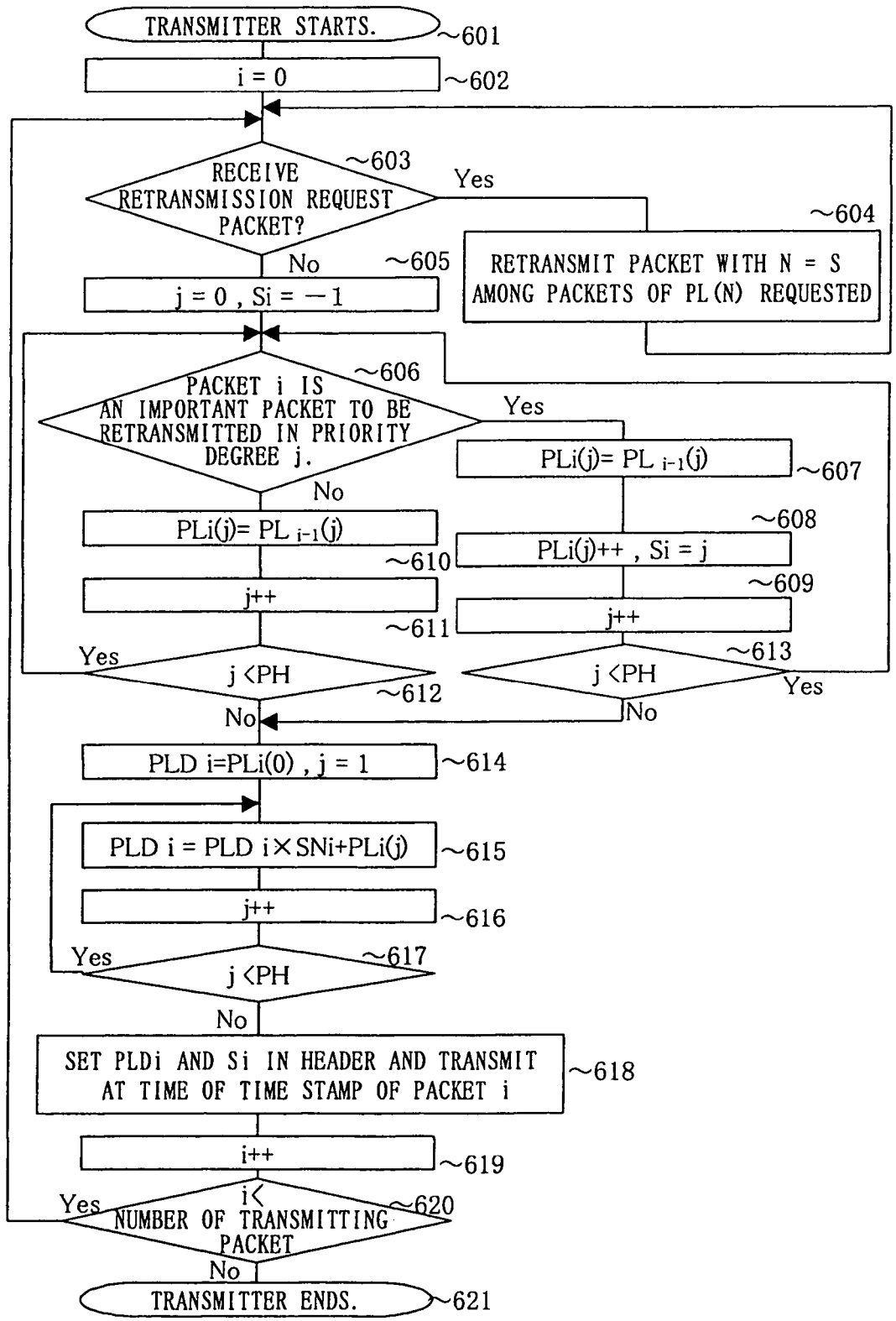
FIG. 4 shows a flow chart of an example of operations by a transmitter in Embodiment 1.
Figure 5:
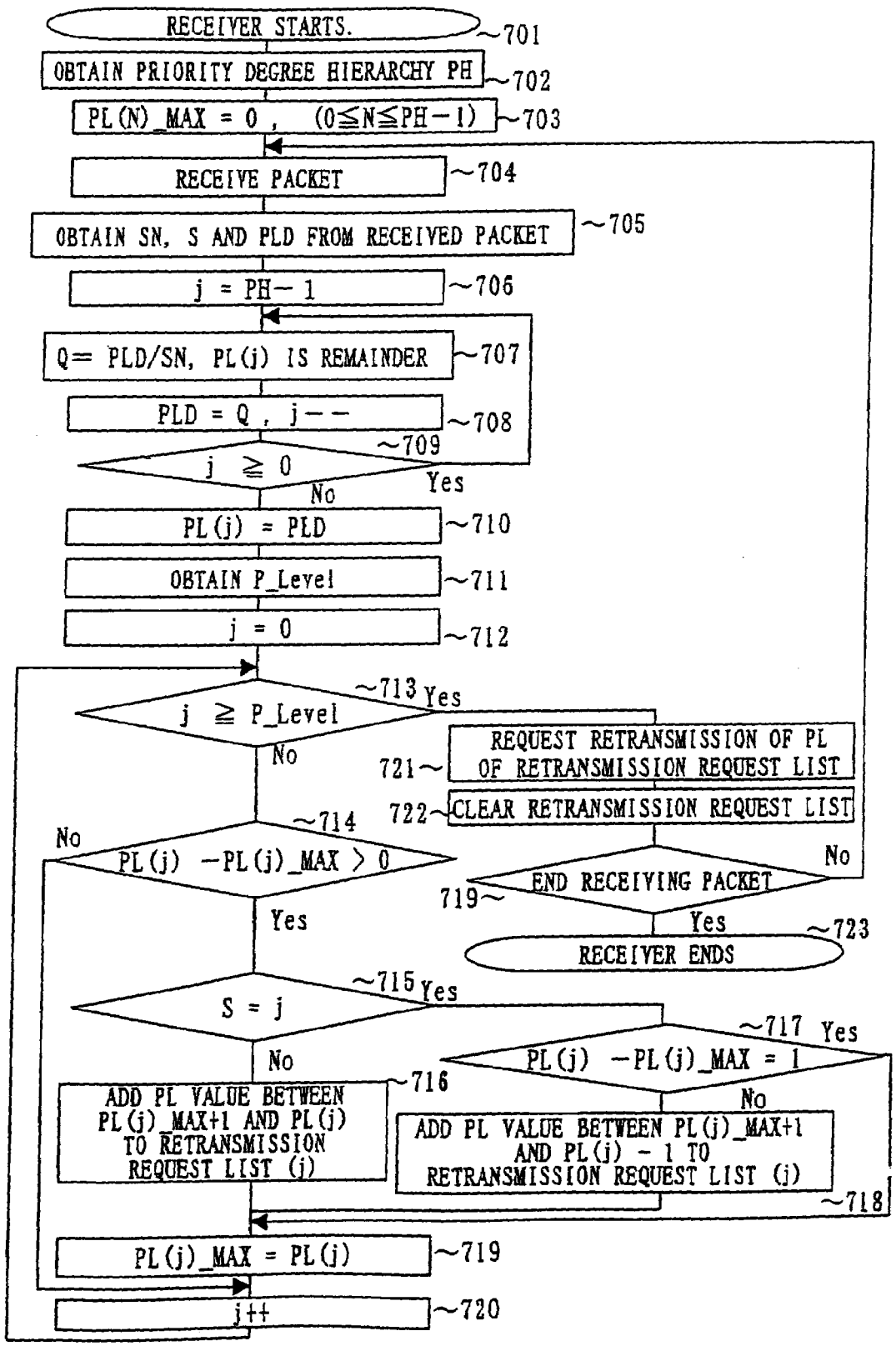
FIG. 5 shows a flow chart of an example of operations by a receiver in Embodiment 1.

FIG. 4 shows a flow chart of an example of the operations by the transmitter in Embodiment 1. FIG. 5 shows a flow chart of an example of the operations by the receiver in Embodiment 1.

This shows a sequence of a packet which is being processed among packets to be sent.

Figure 7:
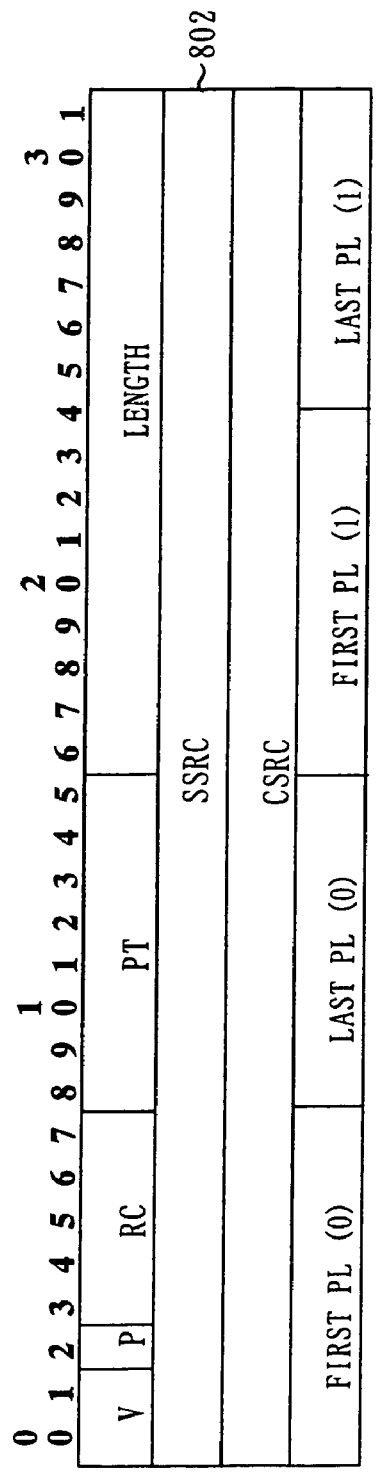
FIG. 7 illustrates an example of a configuration of a RTCP for requesting the retransmission in Embodiment 1.

The transmitter calculates PLDi (PLD of the i-th packet) from the packet with i=0, and transmits the packet. At first, when the transmitter receives the retransmission request packet (Yes in 603), the retransmitting unit 119 retransmits the packet of which retransmission is requested (604). In the retransmission request packet, PL of each of priority degrees, which is desired to be retransmitted, is written. For example, information of requesting a packet with PL(0)=5, 6 and PL(1)=4 is written in the retransmission request packet. The retransmission request packet can be in any configuration as far as the PL for requesting the retransmission is written. FIG. 7 (802) illustrates an example of the RTCP packet for requesting the retransmission with PH=2. However, since there is a possibility that there are a plurality of packets with an equal PL, the retransmitting unit 119 is not able to identify the important packet to be retransmitted only by the PL. Therefore, the retransmitting unit 119 retrieves a sequence number of the packet of which retransmission is requested based on two values of the PL and the priority degree display S of each of the packets. A priority degree display Si of a packet shows that packet i is an important packet to be retransmitted in the priority degree display Si.

A lower part of FIG. 3 illustrates an example of detecting the retransmission packet based on the retransmission request packet by the retransmitting unit 119 in the transmitter.

In this example, the retransmission request packet requests retransmission of a packet with PL(0)=5, 6 and PL(1)=4 (506). In this case, the retransmitting unit 119 detects a packet of sequence number 13 (508) with PL(0)=5 and S=0, a packet of sequence number 14 (509) with PL(0)=6 and S=0, and a packet of sequence number 12 (507) with PL(1)=4 and S=1 as packets to be retransmitted.

When the retransmission request packet is not received (No in 603), the priority degree setting unit 114 calculates all PL's of the packet i. The priority degree setting unit 114 calculates PL's from the priority degree 0 in a higher order to priority degree PH−1 sequentially among the plurality of priority degrees. An order among the plurality of priority degrees is indicated as j, and j is a value in a range of $0 \leq j < PH$. An initial value of j is 0. S indicates a timing when 1 is added to the PL, and an initial value of S is −1 (605).

If the packet i is an important packet to be retransmitted in the priority degree j (606), the priority degree setting unit 114 sets PLi(0) equal to PLi−1(i) plus one, and sets Si=j (607 and 608). If the packet i is important in a priority degree in a certain order, the packet i is not important in a priority degree in another order. Therefore, each PLi of another order is set to be equal to PLi−1 (610). In other words, when the packet i is not important in the priority degree j (606), the priority degree setting unit 114 sets PLi(j)=PLi−1 (j) (610), and the processing goes to a priority degree in a next order (j++) (611).

The priority degree setting unit 114 performs this processing for all of the plurality of priority degrees, and calculates all of PLi(j) corresponding to the packet i. The priority degree setting unit 114 repeats steps of 606~612 PH times. The PL set by the priority degree setting unit 114 is stored in the set priority degree memory 117.

Then, the priority degree information calculating unit 115 calculates PLDi from PLi. A general equation for obtaining the PLDi is as follows:

$$PLDi(0)=PLi(0) \quad (614)$$

$$PLDi(j)=PLDi(j-1) \times SNi+PLi(j) \quad 1 \leq j \leq PH-1 (615, 616, 617)$$

The priority degree information calculating unit 115 obtains PLDi=PLDi (PH−1) in calculating by using this general equation.

The priority degree information attachment processing unit 116 attaches the PLDi calculated in this way and the Si to the packet header, and transmits at a time of time stamp of the packet i.

FIG. 6 (801) illustrates an example of attaching the PLDi and Si to the RTP header.

As a configuration of the packet header, as far as PLDi and Si are attached, another configuration besides the configuration of FIG. 6 (801) is possible.

Then, i is incremented, and a same processing is repeated for a next packet. The same processing is performed for all of the plurality of transmitting packets.

With reference to FIG. 5, the operations by the receiver are explained.

In the receiver, the priority degree information attaching unit 113 obtains priority degree hierarchy PH of the packet which is sent to the receiver (702). As a method for obtaining, there is a method for notifying a value of PH from the transmitter in advance before starting transmission of the packet.

When the priority degree information attaching unit 113 receives the packet (704), the packet information extracting unit 134 extracts the sequence number SN, priority degree display S, and priority degree data PLD as the priority degree information from the received packet (705). The extracted sequence number SN, priority degree display S, and priority degree data PLD are stored in the packet information memory 138.

Then, the priority degree calculating unit 135 calculates each PL from the PLD.

At first, the priority degree calculating unit 135 sets j=PH−1 (706). Then, the priority degree calculating unit 135 substitutes a quotient obtained by dividing PLD with SN for the PLD, and substitutes a remainder for PL(j) (707). The priority degree calculating unit 135 reduces j by one sequentially, and performs the same processing. Accordingly, all the PL's can be obtained (708, 709). The priority degree calculating unit 135 stores the calculated PL's in the calculated priority degree memory 139.

Then, the retransmission request selecting unit 137 selects a priority degree level P_Level ($0 \leq P\_Level \leq PH-1$) showing a range of orders of the priority degrees for requesting retransmission, and notifies the lost packet detecting unit 136 (711). The priority degree level P_Level is indicated in an order of the priority degree. For example, when a network condition is bad, a value becomes lower (a priority degree in a higher order is used). When the network condition is good, the value becomes higher (a priority degree in a lower order is used). The priority degree level P_Level does not only depend on the network condition. The priority degree can be set freely. P_Level=PH−1 is a value when all the priority degrees are used.

Then, the lost packet detecting unit 136 detects loss of an important packet to be retransmitted. Since detection is started from the priority degree 0 which is the highest order, the priority degree j=0 (712). If j is larger than the priority degree level P_Level (713), the lost packet detecting unit 136 requests to retransmit the important packet to be retransmitted which is lost in the priority degree j (721).

When a value of deducting PL(j)_MAX (a maximum value of PL(j) among the packets which have been received) from PL(j) is 0, the lost packet detecting unit 136 judges that there is a possibility that a packet is lost, however the important packet to be retransmitted is not lost in the priority degree j. Therefore, the lost packet detecting unit 136 does not detect packet loss, and goes to a processing for a next priority degree. However, when a value of deducting PL(j)_MAX from PL(j) is larger than 0 (714), the lost packet detecting unit 136 can judge that there is a possibility that the important packet to be retransmitted is lost in the priority degree j.

In this case, if S is equal to j (715), a packet which is received now is the important packet to be retransmitted in the priority degree j. Therefore, the lost packet detecting unit 136 can know that the packet of PL(j) is not lost. In this case, if a value of deducting PL(j)_MAX from PL(j) is 1 (717), the important packet to be retransmitted is not lost in the priority degree j. Therefore, the lost packet detecting unit 136 substitutes PL(j) for PL(j)_MAX (719). However, if the value of deducting PL(j)_MAX from PL(j) is larger than one (717), PL from PL(j)_MAX to PL(j)−1 is lost. Therefore, the lost packet detecting unit 136 adds the lost PL to the retransmission request list (j) (718).

Similarly, when S is not equal to j (715), PL from PL(j)_MAX to PL(j) is lost. Therefore, the lost packet detecting unit 136 adds the lost PL to the retransmission request list (j) (716).

Then, by setting PL(j)_MAX=PL(j), j++ (719, 720), processing is continued for a next priority degree.

When j is larger than the priority degree level P_Level (713), i.e., the priority degree for checking the loss exceeds the priority degree level, the lost packet detecting unit 136 instructs the retransmission packet transmitting unit 141 to request the transmitter to retransmit the PL maintained in the retransmission request list (721). The retransmission packet transmitting unit 141 transmits the retransmission request packet to the transmitter. Then, the lost packet detecting unit 136 clears the retransmission request list (722). In the receiving equipment 130, when the packet is continued to be received, the receiving unit 131 receives a new packet, and the retransmission requesting unit 133 performs a similar processing (719). When there is no PL maintained in the retransmission request list, the retransmission is not requested.

Figure 8:
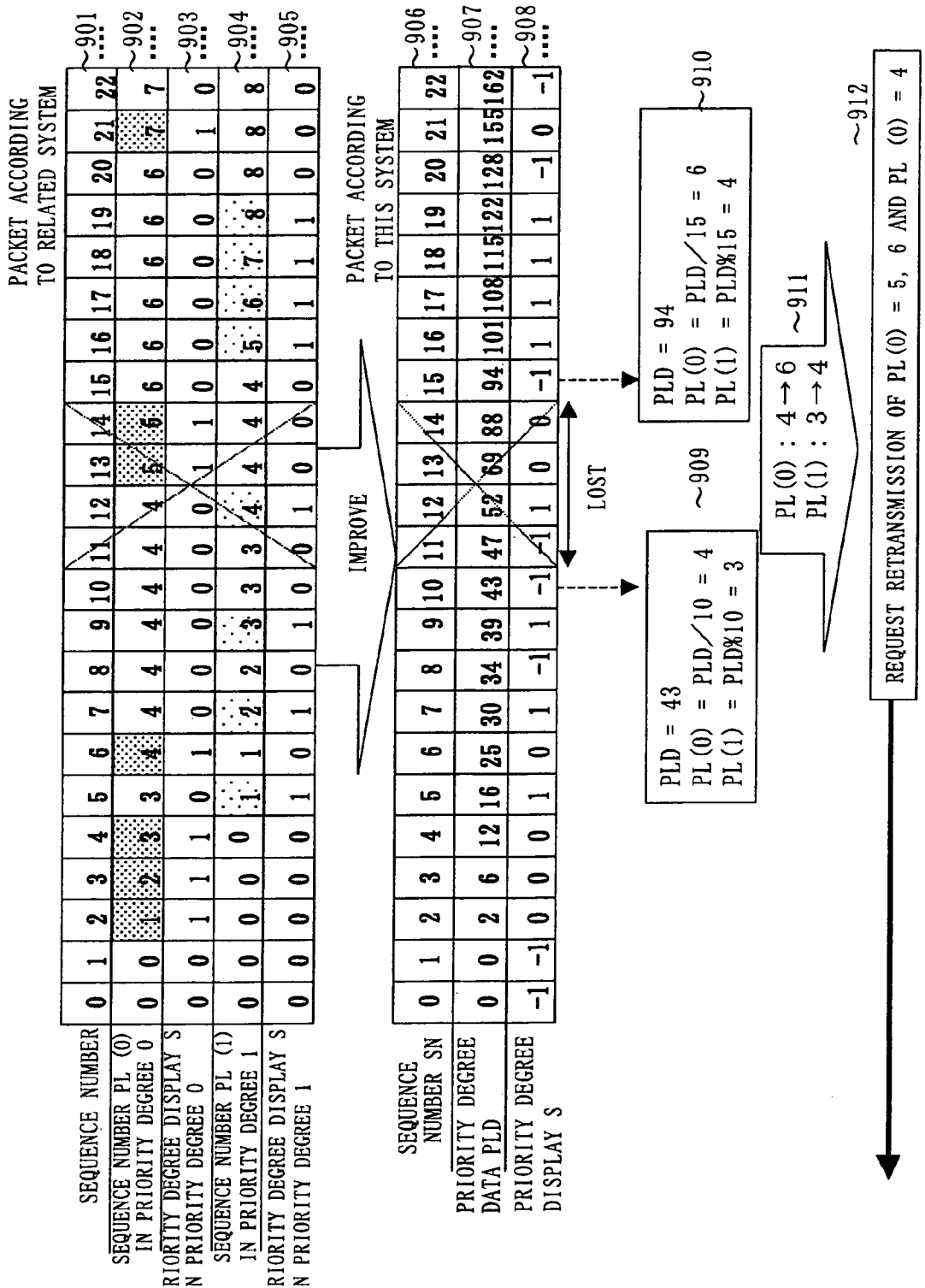
FIG. 8 shows an example of operations for requesting the retransmission in case of PH=2 in Embodiment 1.

FIG. 8 illustrates an example of identification of PL(N) by the receiver and the retransmission request in case of PH=2 in this embodiment.

In FIG. 8, 901≠905 show that sequence numbers (PL(0) (902) and PL(1) (904)) in two priority degrees must be attached to the packet header when two priority degrees are set in a system according to the related art. 906≠908 show an example in which priority degree data PLD(907) are attached to the packet header as one of the priority degree information when two priority degrees are set in the packet retransmitting system of this embodiment.

With reference to FIG. 8, a method for requesting retransmission of a lost packet based on the processing by the receiver of this embodiment is explained.

We assume that packets of sequence numbers 11–14 are lost. Since the PLD of sequence number 10 is 43, $PL_{10}(0)$ is a quotient obtained by dividing 43 by 10, and $PL_{10}(1)$ is a remainder obtained by dividing 43 by 10. Therefore, $PL_{10}(0)$=4, $PL_{10}(1)$=3 (909). Similarly, since the PLD of sequence number 15 is 94, $PL_{15}(0)$ is a quotient obtained by dividing 94 by 15, and $PL_{15}(1)$ is a remainder obtained by dividing 94 by 15. Therefore, $PL_{15}(0)$=6, $PL_{15}(1)$=4 (910). Further, since the priority degree display S of sequence number 15 is −1, the packet of sequence number 15 is not an important packet to be retransmitted in the priority degree 0 and the priority degree 1. Accordingly, the lost packet detecting unit 136 detects that $PL_{10}(0)$−$PL_{15}(0)$, i.e., PL(0) of 5 and 6, are lost in the priority degree 0, and $PL_{10}(1)$−$PL_{15}(1)$, i.e., PL(1) of 4, are lost in the priority degree 1 (911). The retransmission packet transmitting unit 141 transmits a retransmission request packet for requesting to retransmit these PL's to the transmitter (912).

When a value of the priority degree data PLD becomes larger, it becomes impossible to display the value in a register allocated to the PLD. In such a case, a plurality of priority degrees are initialized, and the priority degrees are set again.

Further, each of elements in the transmitting equipment 110 and the receiving equipment 130 illustrated in FIG. 1 can be realized as any one of hardware, firmware, and software.

EMBODIMENT 2

In Embodiment 2, a case of calculating the priority degree data so that the value of the PLD becomes smaller than Embodiment 1 is explained.

In the receiver, the priority degree data PLD are treated as PLD=SN×Q+R. Q is a quotient of PLD/SN, and R is a remainder of 3. Values of Q and R are also set smaller for each of the packets.

In the following explanation, explanations are made by using an equation of PLD=SN×Q+R.

At first, setting of the value of Q is explained. Variables A, B and C calculated in the following equation are defined.

A=|PLD(N−1)−PL(N)|, B=|SN−PLD(N−1)|, C=|SN−PL(N)|, and a minimum value among A, B and C is defined as Q. Further, an identifier PQ for identifying which value among three values is defined as Q, and displayed in 2 bits for example.

In case of Q=PL(0), i.e., same as Embodiment 1, PQ=00.
In case of Q=A, PQ=01.
In case of Q=B, PQ=10.
In case of Q=C, PQ=11.

Further, since A, B and C are absolute values of difference between two values, indicated as |X−Y|, an identifier (flag) PD for indicating which one of X and Y is larger is defined, and displayed in 1 bit length as follows:

In case of X≧Y, PD=0.
In case of X<Y, PD=0.

In this embodiment, a case in which the priority degree information includes the priority degree data PLD, the identifier PQ and the identifier (flag) PD is explained.

Figure 9:
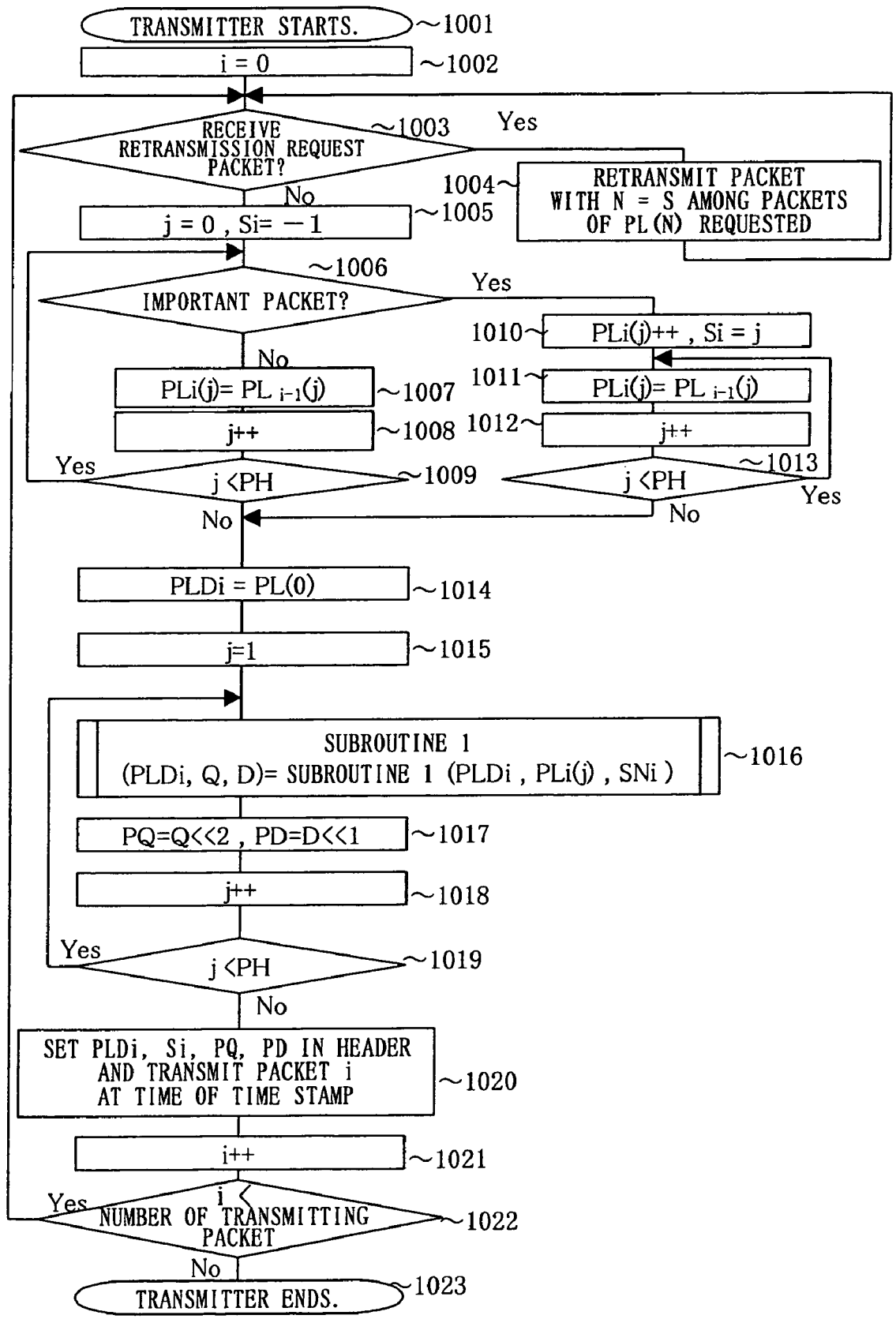
FIG. 9 shows a flow chart for explaining an example of the operations by the transmitter in Embodiment 2.
Figure 10:
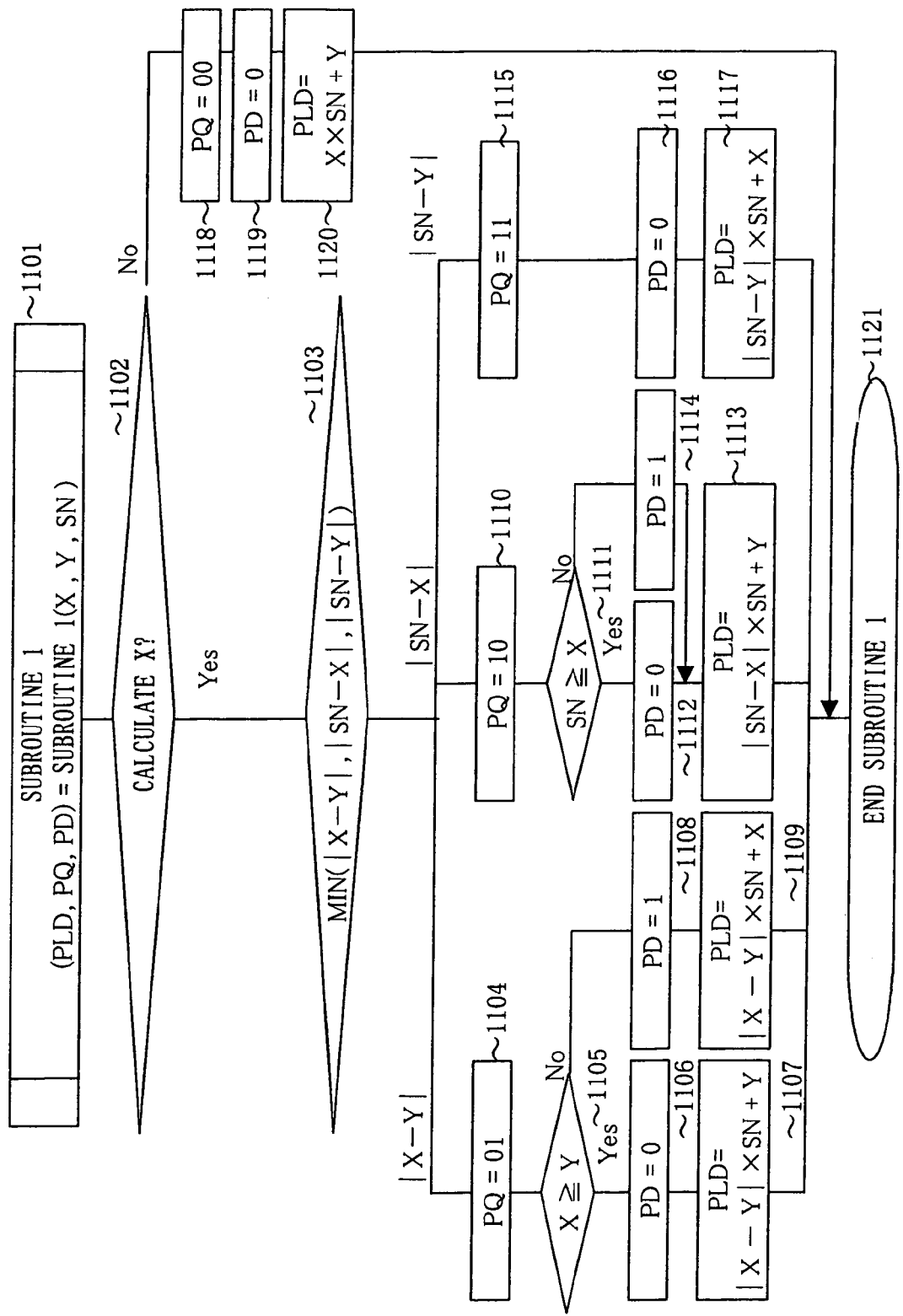
FIG. 10 shows a flow chart for explaining an example of a process of subroutine 1 in Embodiment 2.
Figure 11:
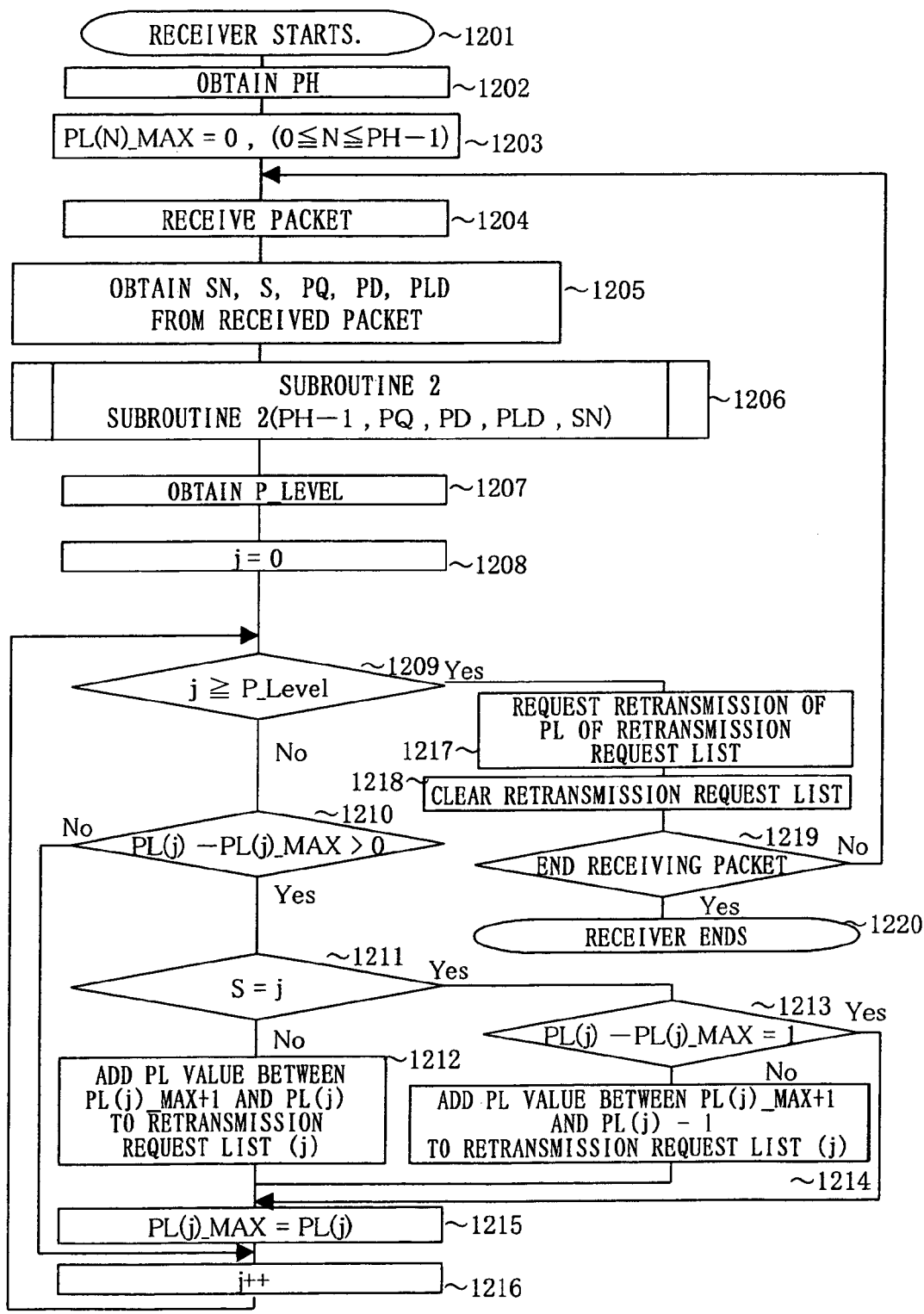
FIG. 11 shows a flow chart for explaining an example of operations by the receiver in Embodiment 2.
Figure 12:
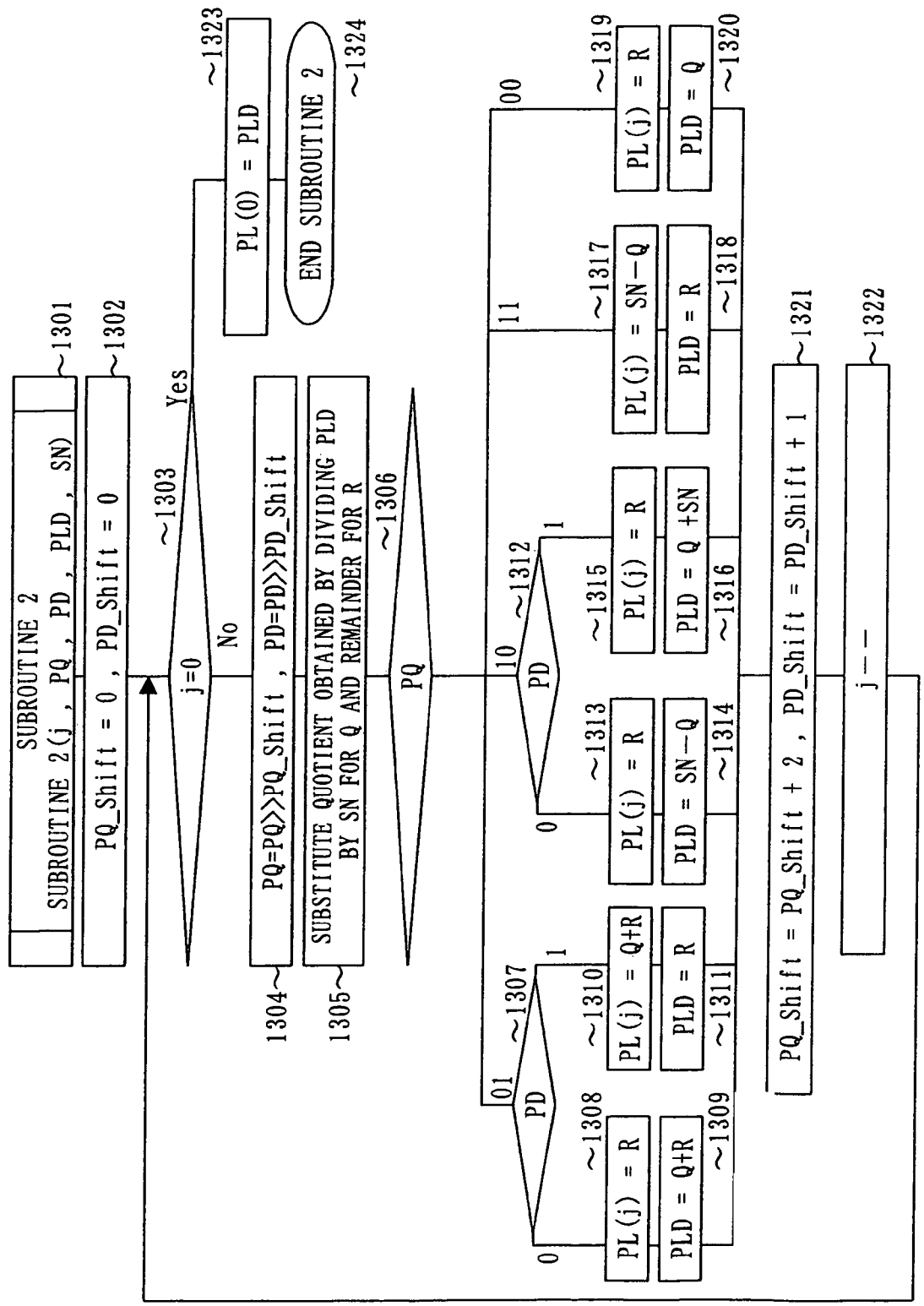
FIG. 12 shows a flow chart for explaining an example of a process of subroutine 2 in Embodiment 2.

FIG. 9 and FIG. 10 are flow charts of the transmitter in Embodiment 2 of this retransmitting system. FIG. 11 and FIG. 12 are flow charts of the receiver.

The transmitting equipment 110 in the transmitter calculates PLDi from the packet of i=0, and transmits the packet. At first, when the transmitter receives the retransmission request packet (Yes in 1003), the retransmitting unit 119 retransmits the packet of which retransmission is requested (1004). In the retransmission request packet, PL of each of the priority degrees desired to be retransmitted is written. The retransmission request packet and the retransmission packet are retrieved in a same method with Embodiment 1.

Next, the priority degree setting unit 114 calculates all of PL's of the packet i. The priority degree setting unit 114 calculates the PL's from the priority degree 0 in a higher order to priority degree PH−1 sequentially among the plurality of priority degrees. A method for calculating the PL's is same as Embodiment 1.

Next, the priority degree information calculating unit 115 calculates PLDi by using PLi. The priority degree information calculating unit 115 calculates by using the equation (PLD=Q×SN+R) explained in the above. In Embodiment 2, the priority degree information calculating unit 115 sets the values of Q and R smaller so that the value of the PLD becomes further smaller.

An order among the plurality of priority degrees is indicated as j, and j is a value in a range of 1≦j<PH−1. A general equation for obtaining the PLDi is as follows:

$$PLDi(0)=PLi(0) \quad (1014)$$

$$PLDi(j)=|PLDi(j-1)-PLi(j)|\times SNi+PLi(j) \quad \text{equation 1 (1107)}$$

$$PLDi(j)=|PLDi(j-1)-PLi(j)|\times SNi+PLi(j-1) \quad \text{equation 2 (1109)}$$

$$PLDi(j)=|SNi-PLDi(j-1)|\times SNi+PLi(j) \quad \text{equation 3 (1113)}$$

$$PLDi(j)=|SNi-PLi(j)|\times SNi+PLDi(j-1) \quad \text{equation 4 (1117)}$$

$$1 \leq j \leq PH-1$$

The priority degree information calculating unit 115 selects an equation to get a smaller PLDi(j) for each of the priority degrees j among equations 1–4 for obtaining PLDi. From this general equation, it can be obtained by PLDi=PLDi(PH−1).

Therefore, the priority degree information calculating unit 115 sets PLDi (0)=PLi(0) as an initial value (1014). PLDi(0) is for the priority degree 0. Next, the priority degree information calculating unit 115 obtains the PLDi by applying each of the priority degrees to equations 1–4 from the priority degree 1. The priority degree information calculating unit 115 sets the priority degree j to 1 (1015).

Next, the priority degree information calculating unit 115 calculates the PLD by using the subroutine 1 (1016). At first, a judgement is made on if X is calculated or X is used without calculation as in Embodiment 1 (1102). The priority degree information calculating unit 115 selects a minimum value among three values of |PLDi(j−1)−PLi(j)|, |SNi−PLDi(j−1)|, and |SNi−PLi(j)| corresponding to quotients (Q) of equations 1–4 (1103). The selected value is defined as Q, and an identifier for identifying the value of Q is defined as PQ as stated earlier.

Further, in case of PQ=01 (1104), a judgement is made on which value is larger between PLDi(j−1) and PLi(j). The identifier for identifying is defined as PD as stated earlier. Therefore, PD is as follows:

In case of PLDi(j−1)≧PLi(j), PD=0 (1106)
In case of PLDi(j−1)<PLi(j), PD=1 (1108)

Similarly, in case of PQ=10 (1110), a judgement is made on which is a larger value between SNi and PLDi(j−1). PD is as follows:

In case of SNi≧PLDi(j−1), PD=0 (1112).
In case of SNi<PLDi(j−1), PD=1 (1114).

In case of PQ=11 (1115), always Sni≧PLi(j). Therefore, PD=0 (1116).

In case of PQ=01, PD=0, equation 1 is selected. In case of PQ=01, PD=1, equation 2 is selected. In case of PQ=10, equation 3 is selected. In case of PQ=11, equation 4 is selected, and the PLDi is obtained.

When the PLDi is obtained in a method for using X without calculation as in Embodiment 1 (No in 1102), PQ=00, PD=0 (1118, 1119). The PLDi is obtained by using an equation of PLDi(j)=PLDi(j−1)×Sni+PLi(j) (1120). In this way, the PLD is calculated through a procedure of the subroutine 1 (1016).

Next, the PQ and PD are bit-shifted (1017), the priority degree j is incremented (j+1) (1018), and PLDi(j) in a next priority degree is obtained. In a range with j smaller than PH, this processing is repeated (1019). A last PLDi (PH−1) is a PLDi corresponding to the packet i.

The priority degree information attachment processing unit 116 attaches the Si, PLDi, PQ and PD calculated in this way to the header. The transmitting unit 111 transmits at a time of a time stamp included in the packet header of the packet i (1020).

FIG. 13 (1402) illustrates an example of attaching the PLDi and Si to the RTP header.

A configuration of the header is not limited to a configuration of FIG. 13 (1402). As far as the Si, PLDi, PQ and PD are attached, another configuration is possible.

Next, i is incremented (i++), and a similar processing if performed for a next packet (1021, 1022).

Next, with reference to FIG. 11 and FIG. 12, operations of the receiver are explained.

In the receiver, the retransmission requesting unit 133 obtains a priority degree hierarchy PH of a packet which is sent (1202). As a method for obtaining, there is a method for informing of a value of the PH from the transmitter in advance before starting transmission of the packet for example.

When the receiving unit 131 receives the packet (1204), the packet information extracting unit 134 extracts the sequence number SN, priority degree display S, identifier PQ, identifier PD and priority degree data PLD from the packet header of the received packet (1205). The extracted sequence number SN, priority degree display S, identifier PQ, identifier PD and priority degree data PLD are stored in the packet information memory 138.

Next, the priority degree calculating unit 135 calculates each of PL's from the PLD. At first, the priority degree calculating unit 135 sets j=PH−1, substitutes a quotient obtained by dividing PLD(j) by SN for Q(j), and substitutes a remainder for R(j) (1305). Then, the priority degree calculating unit 135 calculates all PL's from the PLD, PQ and PD through a procedure of subroutine 2 (FIG. 11) (1206). Then, PQ of the priority degree j is substituted for PQ(j), the PQ is bit-shifted and PQ(j) is obtained (1306).

Next, the priority degree calculating unit 135 obtains PL(j) through a following processing.

In case of PQ(j)=01 and PD(j)=0, PL(j)=R, and PLD(j−1)=Q+R (1308, 1309).
In case of PQ(j)=01 and PD(j)=1, PL(j)=Q+R, and PLD(j−1)=R (1310, 1311).
In case of PQ(j)=10 and PD(j)=0, PL(j)=R, and PLD(j−1)=SN−Q (1313, 1314).
In case of PQ(j)=10 and PD(j)=1, PL(j−1)=R, and PLD(j−1)=Q+SN (1315, 1316).
In case of PQ(j)=11, PL(j)=SN−Q, and PLD(j−1)=R (1317, 1318).
In case of PQ(j)=00, PL(j)=R, and PLD(j−1)=Q (1319, 1320).

By reducing j one by one and performing this processing (1322), all PL's can be obtained. In case of j=0, PD(0)=PLD(0) (1323). The priority degree calculating unit 135 stores the priority degrees PL calculated in the above procedure in the calculated priority degree memory 139.

Next, the retransmission request selecting unit 137 selects a priority degree level P_Level indicating a range of orders of the priority degrees for requesting the retransmission, and informs the lost packet detecting unit 136 (1209). The priority degree level P_Level is same as the one explained in Embodiment 1.

Next, the lost packet detecting unit 136 detects loss of an important packet to be retransmitted. The retransmission packet transmitting unit 141 requests retransmission of the detected packet. A method for detecting the loss of the packet and requesting the retransmission is same as Embodiment 1.

Figure 15:
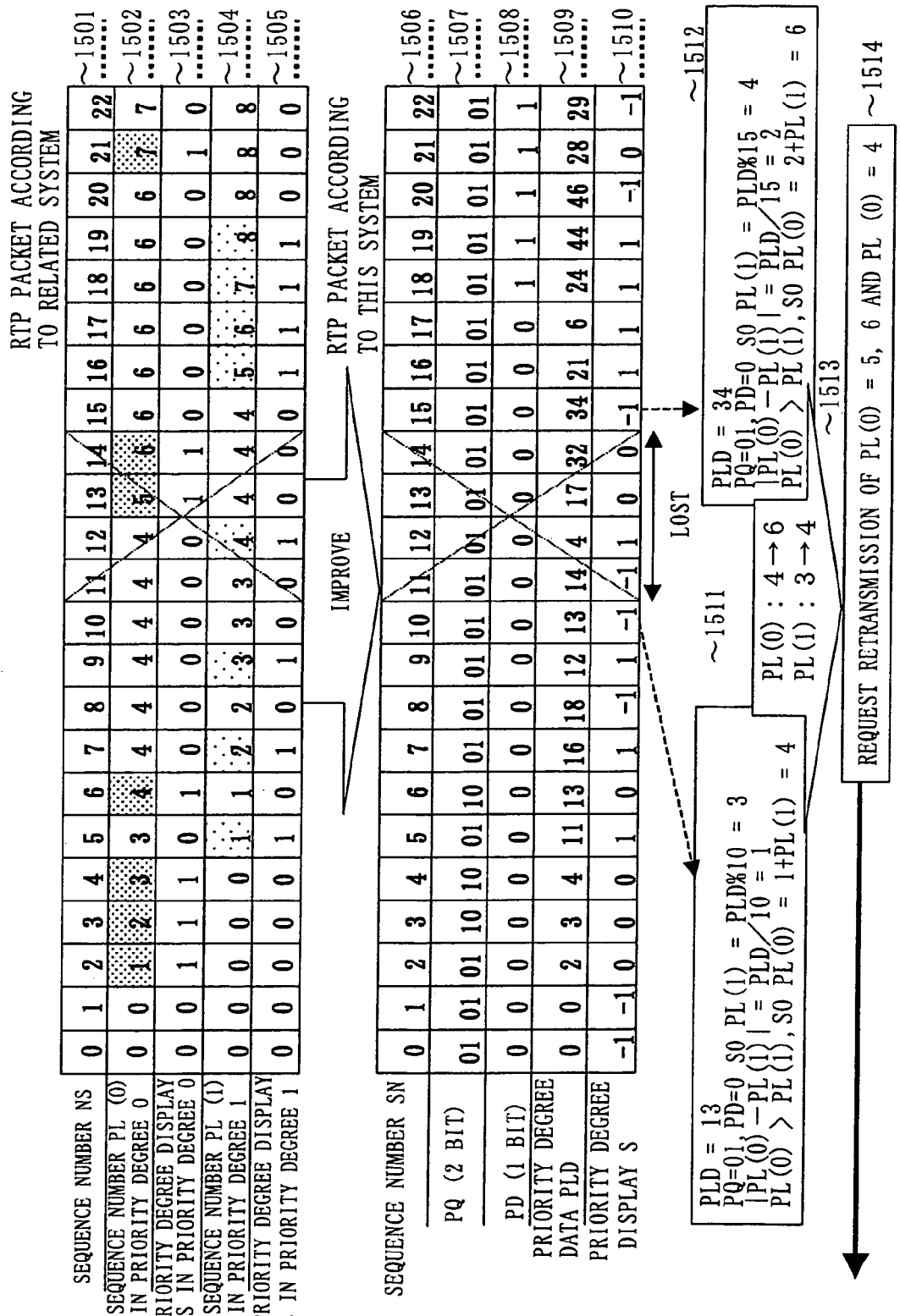
FIG. 15 shows an example of operations for requesting the retransmission in case of PH=2 in Embodiment 2.
Figure 17:
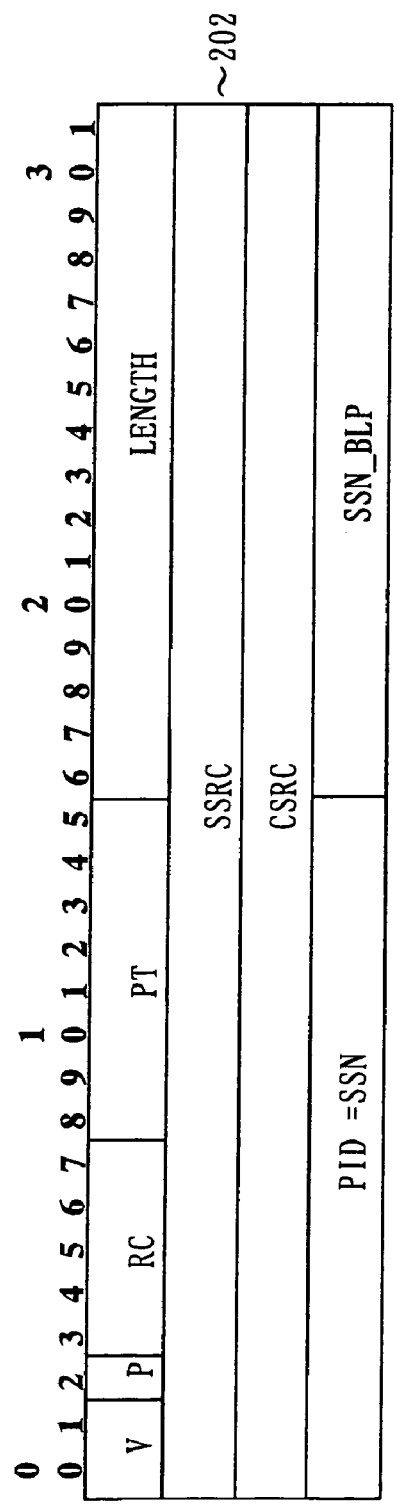
FIG. 17 illustrates an example of a configuration of the RTCP packet for requesting the retransmission according to the related art.
Figure 18:
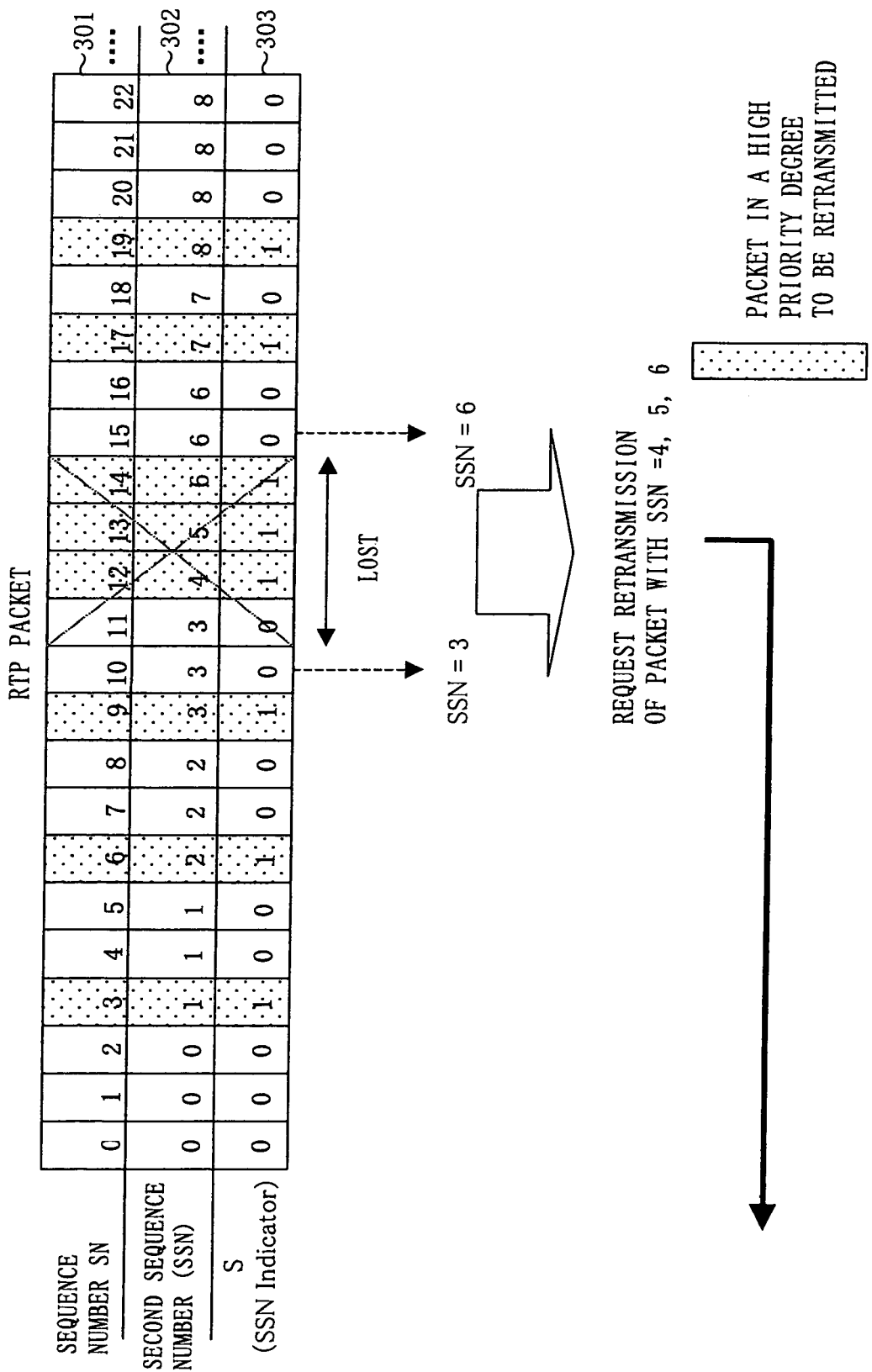
FIG. 18 shows an example of a second sequence number SSN and operations for requesting the retransmission according to the related art.

FIG. 15 illustrates an example of identification of PL(N) by the receiver and the retransmission request in case of PH=2 in this embodiment.

In FIG. 15, 1501–1505 show that two sequence numbers (PL(0) (1502) and PL(1) (1504)) of the priority degrees must be attached to the packet header when two priority degrees are set in a system according to the related art. 1506–1510 show an example in which one of priority degree data PLD(1509), identifier PQ and identifier PD (1507, 1508) are attached when two priority degrees are set in the packet retransmitting system of this embodiment.

With reference to FIG. 15, a method for requesting retransmission of a lost packet based on the processing by the receiver of this embodiment is explained.

We assume that packets of sequence numbers 11–14 are lost. Since the PLD of sequence number 10 is 13, a quotient (Q) obtained by dividing 13 by 10 is 1, and a remainder (R) is 3. Since PQ of sequence number 10 is 01, and PD is 0, $PL_{10}(0)=Q+R=4$, $PL_{10}(1)=R=3$ (1511). Similarly, since the PLD of sequence number 15 is 34, a quotient (Q) obtained by dividing 34 by 15 is 2, and a remainder (R) is 4. $PL_{15}(0)$ is a quotient obtained by dividing 94 by 15, and $PL_{15}(1)$ is a remainder obtained by dividing 94 by 15. Since PQ of sequence number 15 is 01 and PD is 0, $PL_{10}(0)=Q+R=6$, $PL_{10}(1)=R=4$ (1512). Further, since the priority degree display S of sequence number 15 is −1, the packet of sequence number 15 is not an important packet to be retransmitted in the priority degrees 0 and 1. Accordingly, it is detected that $PL_{10}(0)$—$PL_{15}(0)$, i.e., PL(0) of 5 and 6, are lost in the priority degree 0, and $PL_{10}(1)$–$PL_{15}(1)$, i.e., PL(1) of 4, are lost in the priority degree 1 (1513). The retransmission packet transmitting unit 141 transmits a retransmission request packet for requesting to retransmit these PL's to the transmitter (1514).

EMBODIMENT 3

In Embodiments 1 and 2, a case of PH=2 was explained as an example. However, even when PH is larger than 2, this packet retransmitting system can be applied.

For example, in FIG. 7, PL is specified in case of PH=1≠2. However, for specifying the PL in case of PH=3≠4, another row of format data of a last line is added. In case of PH=5≠6, another row is further added. Information on the PL for requesting the retransmission is added.

EMBODIMENT 4

In Embodiment 1 and 2, as a determined value used by the priority degree information calculating unit 115, two examples were shown. It is also possible that another determined value is used to calculate the priority degree information. As far as the priority information is calculated based on an equation of PLD(N)=determined value×SN+PL (N), the packet retransmitting system and method can be applied.

INDUSTRIAL APPLICABILITY

In the transmitting equipment, the receiving equipment and the packet retransmitting system and method using the above two equipments according to this invention, the transmitter can transfer data including a plurality of priority degrees in a packet. The receiver can judge if retransmission of a lost packet should be requested or not for each of the priority degrees. For example, in moving picture data compressed by MPEG (Moving Picture Experts Group) system, a moving picture includes I frame, P frame and B frame. Each of the frames has a priority degree. A priority degree of a packet in which I frame data are provided is the highest. A priority degree of P frame is next. A priority degree of B frame is low. In this case, according to the packet retransmitting system in which the plurality of priority degrees can be set, priority degree 0 is allocated to I frame, and P frame is allocated to priority degree 1. Therefore, even if a packet is lost, it is possible to request to retransmit only a packet in which data of I frame and P frame are provided and to retransmit the packet.

As stated, the packet retransmitting system of this invention can be applied to a server (transmitting equipment) for performing streaming distribution of multimedia data by transmitting and receiving data punctually at a determined time through Internet and wireless communication network and a client (receiving equipment).

Further, even for a packet including a plurality of priority degrees, the receiver can identify the plurality of priority degrees only by one of the priority degree data PLD.

Further, the retransmission request selecting unit can select a retransmission request of an appropriate priority degree dynamically according to a condition of the network and characteristics of the data. Therefore, it is possible to prevent congestion in the network due to the retransmission request and the retransmission. It is also possible to offer a quality which is appropriate for the condition of the network and contents to be transferred.

Further, the priority degree information calculating unit 115 can reduce a value of the priority degree data included in the priority degree information by selecting a determined value used for calculating the priority degree information appropriately. Therefore, attaching amount to a transmission packet can be reduced.

The invention claimed is:

1. A packet retransmitting system for transmitting a packet including a sequence number for defining a sequence of data included in each of a plurality of packets through a network and retransmitting a packet which is lost during transmission, the packet retransmitting system comprising:

transmitting equipment for transmitting the plurality of packets; and receiving equipment for receiving the plurality of packets sent by the transmitting equipment, wherein the transmitting equipment includes:

a priority degree information attaching unit for defining a plurality of priority degrees indicating an importance degree of the data, producing a priority degree information value for each of the plurality of packets by using the plurality of priority degrees defined, and attaching the priority degree information value produced to the packet, a transmitting unit for transmitting a plurality of packets to which the priority degree information value is attached by the priority degree information attaching unit through the network, and a retransmitting unit for receiving a retransmission request for requesting to retransmit a packet from the receiving equipment after the transmitting unit transmits the plurality of packets and retransmitting the packet of which retransmission is requested in the retransmission request received, wherein the receiving equipment includes a receiving unit for receiving the plurality of packets sent by the transmitting equipment through the network and a retransmission requesting unit for inputting the plurality of packets received by the receiving unit, extracting a sequence number and a priority degree information value from each of the plurality of packets input, judging lost packets based on the sequence numbers extracted, detecting an important packet among the lost packets judged based on the plurality of priority degree information values extracted, and transmitting the retransmission request to the transmitting equipment to request to retransmit the packet detected;

wherein the priority degree information attaching unit includes:
a priority degree setting unit for setting an importance degree for each of the plurality of priority degrees,
a priority degree memory for storing the plurality of priority degrees set by the priority degree setting unit, and
a priority degree information calculating unit for producing the priority degree information value for each of the plurality of packets by using the plurality of priority degrees stored in the priority degree memory and the sequence number included in the packet.

2. Transmitting equipment for transmitting a packet including a sequence number for defining a sequence of data included in each of a plurality of packets through a network comprising:
a priority degree information attaching unit for defining a plurality of priority degrees indicating an importance degree of the data, producing a priority degree information value for each of the plurality of packets by using the plurality of priority degrees defined, and attaching the priority degree information produced to the packet; and
a transmitting unit for transmitting the packet to which the priority degree information value is attached by the priority degree information attaching unit through the network;
wherein the priority degree information attaching unit includes:
a priority degree setting unit for setting an importance degree for each of the plurality of priority degrees,
a priority degree memory for storing the plurality of priority degrees set by the priority degree setting unit, and
a priority degree information calculating unit for producing the priority degree information value for each of the plurality of packets by using the plurality of priority degrees stored in the priority degree memory and the sequence number included in the packet.

3. The transmitting equipment of claim 2, wherein the priority degree setting unit defines the plurality of priority degrees hierarchically by setting an order, wherein the priority degree information calculating unit calculates the priority degree information values by giving priority to a priority degree in a high order.

4. The transmitting equipment of claim 3, wherein the priority degree setting unit selects a priority degree one by one from a higher order among the plurality of priority degrees, judges an importance degree of data included in the packet based on the priority degree selected, and increases a value of the priority degree selected by one and sets the value of the priority degree selected when it is judged as an important packet.

5. The transmitting equipment of claim 2, further comprising a retransmitting unit for receiving a retransmission request packet for requesting retransmission of a packet after transmitting the plurality of packets from the transmitting unit, retrieving a packet of which retransmission is requested in the retransmission request packet received, and retransmitting the packet retrieved.

6. Transmitting equipment for transmitting a packet including a sequence number for defining a sequence of data included in each of a plurality of packets through a network comprising:
a priority degree information attaching unit for defining a plurality of priority degrees indicating an importance degree of the data, producing priority degree information by using the plurality of priority degrees defined, and attaching the priority degree information produced to the packet; and
a transmitting unit for transmitting the packet to which the priority degree information is attached by the priority degree information attaching unit through the network;
wherein the priority degree information attaching unit includes:
a priority degree setting unit for setting an importance degree for each of the plurality of priority degrees,
a priority degree memory for storing the plurality of priority degrees set by the priority degree setting unit, and
a priority degree information calculating unit for producing the priority degree information by using the plurality of priority degrees stored in the priority degree memory and the sequence number included in the packet;
wherein the priority degree setting unit defines the plurality of priority degrees hierarchically by setting an order, wherein the priority degree information calculating unit calculates the priority degree information by giving priority to a priority degree in a high order;
wherein the priority degree setting unit selects a priority degree one by one from a higher order among the plurality of priority degrees, judges an importance degree of data included in the packet based on the priority degree selected, and increases a value of the priority degree selected by one and sets the value of the priority degree selected when it is judged as an important packet;
wherein the priority degree information calculating unit produces the priority degree information by using a result of adding one of values of the plurality of priority degrees corresponding to the packet to a product of a determined value and the sequence number included in the packet.

7. The transmitting equipment of claim 6, wherein, when a number of the plurality of priority degrees is defined as PH, a value of the plurality of priority degrees is defined as PL(PH), a counter is defined as N, a sequence number included in an arbitrary packet is defined as SN, and a value of the priority degree information calculated for each of the plurality of priority degrees is defined as PLD(PH) for the arbitrary packet, the priority degree information calculating unit substitutes PL(0) for PLD(0) and calculates PLD(N)=the determined value×SN+PL(N) for each of N in a value of 0<N<PH, defines PLD(PH−1) in case of N=PH−1 as the priority degree information PLD of the arbitrary packet, obtains the priority degree information by calculating PLD(PH−1) for each of the plurality of packets, and calculates the plurality of priority degree information.

8. A transmitting equipment of claim 7, wherein the priority degree information calculating unit uses a value of PLD(N−1) as the determined value.

9. The transmitting equipment of claim 7, wherein the priority degree information calculating unit uses one of (|PLD(N−1)−PL(N)|) which is an absolute value of a difference between PLD(N−1) and PL(N), (|SN−PLD(N−1)|) which is an absolute value of a difference between SN and PLD(N−1), and (|SN−PL (N)−1) which is an absolute value of a difference between SN and PL(N) as the determined value.

10. The transmitting equipment of claim 9, wherein the priority degree information calculating unit defines a minimum value among |PLD(N−1)−PL(N)|, |SN−PLD(N−1)|, |SN−PL(N)| as Q, defines an identifier for identifying which value among three values is defined as Q as PQ, defines an identifier for identifying which is larger between X and Y as PD when Q=|X-Y|, sets PQ=TYPE1, PD=0, R=PL(N) in case of Q=|PLD(N-1)-PL(N)| and PLD(N-1)<PL(N), sets PQ=TYPE1, PD=1, R=PLD(N-1) in case of Q=|PLD(N-1)-PL(N)| and PLD(N-1)<PL(N), sets PQ=TYPE2, PD=0, R=PL(N) in case of Q=|SN-PLD(N-1)| and SN≧PLD(N-1), sets PQ=TYPE 2, PD=1 in case of Q=|SN-PLD(N-1)| and SN<PLD(N-1), and sets PQ=TYPE 3, PD=0, R=PLD(N-1) in case of Q=|SN-PL(N)|, and calculates PLD(PH-1), wherein the priority degree information attaching unit attaches PLD(PH-1), PQ and PD to the packet as the priority degree information.

11. Receiving equipment comprising:
a receiving unit for receiving a plurality of packets including a sequence number which defines a sequence of data included in each of the plurality of packets and a priority degree information value produced based on a plurality of priority degrees indicating an importance degree of data included through a network; and
a retransmission requesting unit for inputting the plurality of packets received by the receiving unit, extracting a sequence number and a priority degree information value from each of the plurality of packets input, judging lost packets based on the sequence numbers extracted, detecting an important packet among the lost packets judged based on the priority degree information values, and transmitting a retransmission request to request to retransmit the packet detected;
wherein the retransmission requesting unit detects the important packet by using the importance degree indicated in each of the plurality of priority degrees included in the extracted priority degree information values;
wherein the retransmission requesting unit includes:
a packet information memory for storing the plurality of sequence numbers and the plurality of priority degree information extracted,
a priority degree calculating unit for calculating a value of a plurality of priority degrees by using the sequence numbers and the priority degree information values stored in the packet information memory, and
a lost packet detecting unit for judging a lost packet based on the extracted sequence numbers and detecting if any important packet is lost based on the value of the plurality of priority degrees calculated by the priority degree calculating unit.

12. The receiving equipment of claim 11, wherein the retransmission requesting unit further includes a retransmission request selecting unit for selecting a particular priority degree among the plurality of priority degrees, wherein the lost packet detecting unit detects loss of a packet based on the particular priority degree selected by the retransmission request selecting unit.

13. Receiving equipment comprising:
a receiving unit for receiving a plurality of packets including a sequence number which defines a sequence of data included in each of the plurality of packets and priority degree information produced based on a plurality of priority degrees indicating an importance degree of data included through a network; and
a retransmission requesting unit for inputting the plurality of packets received by the receiving unit, extracting a plurality of sequence numbers and a plurality of priority degree information from each of the plurality of packets input, judging lost packets based on the plurality of sequence numbers extracted, detecting an important packet among the lost packets judged based on the plurality of priority degree information, and transmitting a retransmission request to request to retransmit the packet detected;
wherein the retransmission requesting unit detects the important packet by using the importance degree indicated in each of the plurality of priority degrees included in the plurality of priority degree information;
wherein the retransmission requesting unit includes:
a packet information memory for storing the plurality of sequence numbers and the plurality of priority degree information extracted,
a priority degree calculating unit for calculating a value of a plurality of priority degrees by using the sequence numbers and the priority degree information stored in the packet information memory, and
a lost packet detecting unit for judging a lost packet based on the plurality of sequence numbers and detecting if any important packet is lost based on the value of the plurality of priority degrees calculated by the priority degree calculating unit;
wherein the priority degree calculating unit calculates a quotient and a remainder by dividing the priority degree information by the sequence number, and calculates a value of the plurality of priority degrees by using the quotient and the remainder calculated.

14. The receiving equipment of claim 13, wherein, when the priority degree information is defined as PLD, the sequence number included in an arbitrary packet is defined as SN, a number of the plurality of priority degrees is defined as PH, a value of the plurality of priority degrees is defined as PL(PH), and a counter is defined as N for an arbitrary packet, the priority degree information calculating unit substitutes an initial value of N in a range of 0≦N<PH for N=PH-1, substitutes a remainder of PLD/SN for PL(N), substitutes a quotient of PLD/SN for PLD, repeats a calculation of deducting N by 1 till N reaches 0, calculates a value of the plurality of priority degrees by substituting a value of PLD for PL(0) in case of N=0, calculates PL(PH) for each of the plurality of packets, and calculates the value of the plurality of priority degrees corresponding to the plurality of packets, wherein the lost packet detecting unit judges if a packet with a priority degree indicated by PL(N) is lost based on a difference between values of a maximum value in PL(N) corresponding to each of the plurality of packets received and PL(N) of the arbitrary packet, and when the packet has been lost, detects the PL(N) of the packet.

15. The receiving equipment of claim 13, wherein the priority degree information includes priority degree data produced from the plurality of priority degrees, an identifier for indicating a type of data used for producing the priority degree data, and a flag for indicating a size of a value of the identifier for each of arbitrary packets, wherein, when the priority degree data are defined as PLD, the identifier is defined as PQ, the flag is defined as PD, a number of the plurality of priority degrees is defined as PH, a value of the plurality of priority degrees is defined as PL (PH), and a counter is defined as N for an arbitrary packet, the priority degree information calculating unit substitutes an initial value of N in a range of 0≦N<PH for N=PH-1, defines TYPE 1, TYPE 2 and TYPE 3 as types of the identifier PQ, defines that a value of the flag PD is one of 0 and 1, defines a quotient Q obtained by dividing PLD by SN as Q and a remainder as R, sets PL(N)=R and substitutes Q+R for PLD in case of PQ=TYPE 1 and PD=0, sets PL(N)=Q+R and substitutes R for PLD in case of PQ=TYPE 1 and PD=1, sets PL(N)=R and substitutes SN-Q for PLD in case of PQ=TYPE 2 and PD=0, sets PL(N)=R and substitutes Q+SN for PLD in case of PQ=TYPE 2 and PD=1, sets PL N)=SN−Q and substitutes R for PLD in case of PQ=TYPE 3, repeats a calculation of deducting N by 1 from N=PH−1 to N=1, calculates PL from PL(0) to PL(PH−1) by substituting PLD for PL(0) in case of N=1, wherein the lost packet detecting unit judges if an important packet in the priority degree N is lost based on a difference between values of a maximum value of PL(N) of a packet and PL(N) of an arbitrary packet among the plurality of packets received by the receiving unit and detects the PL(N) of the packet lost when the packet has been lost.

16. A packet retransmitting method for transmitting a packet including a sequence number for defining a sequence of data included in each of a plurality of packets from a transmitter to a receiver through a network and retransmitting a packet which is lost during transmission, the packet retransmitting method comprising:
in the transmitter,
defining a plurality of priority degrees indicating an importance degree of data;
storing the plurality of priority degrees that are defined;
producing a priority degree information value for each of the plurality of packets by using the plurality of priority degrees defined and stored, and the sequence number included in the packet, the priority degree information value being attached to the packet; and
transmitting the plurality of packets to which the priority degree information is attached to the receiver through the network, and
in the receiver,
receiving the plurality of packets through the network;
extracting a sequence number and a priority degree information value from each of the plurality of packets received;
judging lost packets based on the extracted sequence numbers;
detecting an important packet among the lost packets judged based on the extracted priority degree information values; and
transmitting a retransmission request to the transmitter to request to retransmit the packet detected.

17. A packet transmitting method for transmitting a packet including a sequence number for defining a sequence of data included in each of a plurality of packets through a network, the method comprising:
defining a plurality of priority degrees indicating an importance degree of the data;
storing the plurality of priority degrees that are defined;
producing a priority degree information value for each of the plurality of packets by using the plurality of priority degrees defined and stored, and the sequence number included in the packet, the priority degree information value being attached to the packet; and
transmitting the packet to which the priority degree information is attached through the network.

18. A packet transmitting method for transmitting a packet including a sequence number for defining a sequence of data included in each of a plurality of packets through a network, the method comprising:
defining a plurality of priority degrees indicating an importance degree of the data;
producing priority degree information by using the plurality of priority degrees defined;
attaching the priority degree information produced to the packet; and
transmitting the packet to which the priority degree information is attached through the network;
wherein the step of defining priority degrees includes:
defining the plurality of priority degrees hierarchically by setting an order,
selecting a priority degree that is selected from a higher priority degree among the plurality of priority degrees,
judging an importance degree in the selected priority degree, and
adding one to a value of the selected priority degree when it is judged as an important packet,
wherein the step of producing the priority degree information includes producing the priority degree information by using a result of adding a value of one of the plurality of priority degrees corresponding to the packet to a product of a determined value and a sequence number included in the packet.

19. The packet transmitting method of claim 18, wherein the step of defining the priority degrees includes setting values of the plurality of priority degrees corresponding to the plurality of packets by setting a value of the plurality of priority degrees repeatedly for the plurality of packets,
wherein the step of producing the priority degree information includes producing the priority degree information corresponding to each of the plurality of packets by producing the priority degree information repeatedly for the plurality of packets.

20. A method for transmitting a plurality of packets, wherein each of the packets includes an attached sequence number, the attached sequence numbers indicating a sequence for transmission of the plurality of packets, the method comprising:
classifying at least some of the packets according to a plurality of priority degrees, each of the priority degrees having a relative importance in comparison with the other priority degrees;
calculating a priority degree information value for each of the packets based on the plurality of priority degrees and the attached sequence number of the packet, the priority degree information value being attached to the packet; and
transmitting each of the packets with its attached priority degree information value,
wherein
after transmission, the priority degree associated with a classified packet is determined at a receiver based on the attached priority degree information value of a preceding packet in the sequence for transmission, and
at least one of the priority degrees is associated with more than one of the packets.

21. The method of claim 20, wherein a number (PH) of priority degrees are defined, the relative importance of each of the priority degrees being indicated by an index N within the range defined by $0 \leq N \leq PH-1$, such that N=0 indicates the priority degree having a highest relative importance, and N=PH−1 indicates priority degree having a lowest relative importance, among the priority degrees, and
the calculating step calculates the priority degree information value for each packet as a function of: the sequence number of the packet; the priority degree associated with the packet, if any; and the number of preceding packets in the sequence for transmission associated with each of the other priority degrees.

22. The method of claim 21, wherein the priority degree information value attached to the packet is calculated by:

if the packet is associated with a priority degree, increasing PL(S) by one;

setting PLD(O)=PL(O); and for each value of index N within the range $1 \leq N \leq PH-1$, calculating $PLD(N)=PLD(N-1) \times SN+PL(N)$ where S=the value of index N for the priority degree, if any, associated with the packet, SN=sequence number of the packet, and PL(N)=the number of preceding packets in the sequence for transmission associated with the priority degree of index N, and PLD(PH-1) is the calculated priority degree information value attached to the packet.

23. A method for receiving a plurality of packets, wherein each of the packets includes an attached sequence number and an attached priority degree information value, the attached sequence numbers indicating a sequence for transmission of the plurality of packets, the method comprising:

determining lost packets within the sequence for transmission using the attached sequence numbers and priority degree information values;

detecting important packets within the lost packets;

classifying the detected important packets according to a plurality of priority degrees, and transmitting a retransmission request to retransmit the detected important packets, wherein each of the priority degrees has a relative importance in comparison with the other priority degrees, at least one of the priority degrees is associated with more than one of the packets, the detecting important packets uses the sequence numbers and the priority degree information values associated with the received packets, and the attached priority degree information value for each of the packets is calculated based on the attached sequence number of the packet and the plurality of priority degrees.

24. The method of claim 23, wherein a number (PH) of priority degrees are defined, the relative importance of each of the priority degrees being indicated by an index N within the range defined by $0 \leq N \leq PH-1$, such that N=0 indicates the priority degree having a highest relative importance, and N=PH-1 indicates priority degree having a lowest relative importance, among the priority degrees, and the detecting step performs the following for a presently received packet:

calculating an importance degree for each of the priority degrees using the sequence number and priority degree information value of the packet;

comparing the calculated importance degrees of the presently received packet with the importance degrees calculated for a previously received packet; and if one of the calculated importance degrees of the presently received packet has increased by more than one with respect to the previously received packet, detecting that an important packet is lost.

25. The method of claim 24, wherein the sequence number of the important packet detected to be lost is between the respective sequence numbers of the presently received packet and the previously received packet, and the priority degree of the important packet detected to be lost is the priority degree associated with the calculated importance degree that increased by more than one.

26. The method of claim 25, wherein the calculating an importance degree for each of the priority degrees includes:

initializing N=PH-1 and retrieving the priority degree information value PLD and the serial number SN from the presently received packet; and while $N \geq 0$, performing the following:

setting Q to be a quotient obtained by calculating PLD/SN;

setting PL(N) to be a remainder obtained by the calculated PLD/SN, where PL(N) is the importance degree of the priority degree corresponding to index N;

resetting PLD to be equal to Q; and decrementing the index N by 1.

27. The method of claim 23, wherein a priority degree level is set based on a network condition, and the detecting important packets detects lost packets that are associated with a priority degree whose relative importance satisfies the priority degree level.

* * * * *